(12) United States Patent
Roman et al.

(10) Patent No.: US 12,425,979 B2
(45) Date of Patent: Sep. 23, 2025

(54) METHODS AND DEVICES OF TRANSMIT POWER CONTROL FOR MULTIPLE TRANSCEIVERS IN A SINGLE DEVICE OR IN A MULTIPLE DEVICE SCENARIO

(71) Applicant: Intel Corporation, Santa Clara, CA (US)

(72) Inventors: John Roman, Hillsboro, OR (US); Nawfal Asrih, Mandelieu-la-Napoule (FR); Mythili Hegde, Karnataka (IN); Sajal Kumar Das, Karnataka (IN); Walid El Hajj, Antibes (FR); Aline C. Kenfack Sadate, Hillsboro, OR (US); George D. Sworo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 17/964,047

(22) Filed: Oct. 12, 2022

(65) Prior Publication Data
US 2023/0156615 A1    May 18, 2023

(30) Foreign Application Priority Data
Nov. 16, 2021    (EP) .................................. 21208590

(51) Int. Cl.
*H04W 52/18*    (2009.01)
*H04W 52/34*    (2009.01)

(52) U.S. Cl.
CPC ........... *H04W 52/18* (2013.01); *H04W 52/34* (2013.01)

(58) Field of Classification Search
CPC .............................. H04W 52/18; H04W 52/34
See application file for complete search history.

(56) References Cited

U.S. PATENT DOCUMENTS 9,531,420 B1 * 12/2016 Prendergast .......... H04W 52/34
9,826,537 B2 * 11/2017 Forenza ............ H04L 25/03891
(Continued)

FOREIGN PATENT DOCUMENTS

EP    2430863 B1 * 11/2019 .......... H04W 52/367

OTHER PUBLICATIONS

European Search Report issued for the European Application No. 21 20 8590.6, dated May 11, 2022, 8 pages (for informational purposes only).

*Primary Examiner* — Hai V Nguyen
(74) *Attorney, Agent, or Firm* — VIERING, JENTSCHURA & PARTNER mbB

(57) ABSTRACT

This disclosure presents methods and devices that implement dynamic transmit power control techniques in terminal devices with multiple radio frequency (RF) transmitters and/or in a multi-terminal device environment to comply with regulatory RF exposure limits and standards while enhancing device performance. For example, the present disclosure provides a device including a processor configured to monitor a transmit power for each of a plurality of transmitters; determine a transmit power reduction to be applied to the plurality of transmitters based on a total simultaneous transmit power of the plurality of transmitters exceeding a threshold; define a respective amount of the transmit power reduction to be applied to each transmitter of the plurality of transmitters based on one or more parameters; and apply the respective amount of the transmit power reduction to each transmitter of the plurality of transmitters.

20 Claims, 15 Drawing Sheets

(56) References Cited

U.S. PATENT DOCUMENTS

| | | | |
|---|---|---|---|
| 9,906,256 B2* | 2/2018 | Prendergast | H04B 1/3838 |
| 10,447,413 B1* | 10/2019 | Nadakuduti | H04B 17/18 |
| 10,595,282 B2* | 3/2020 | Forrester | H04W 52/30 |
| 10,749,582 B2* | 8/2020 | Forenza | H04B 7/0632 |
| 10,939,387 B2* | 3/2021 | Jadhav | H04W 52/367 |
| 11,070,279 B2* | 7/2021 | Raghavan | H04B 7/0417 |
| 11,071,067 B2* | 7/2021 | Park | H04W 52/146 |
| 11,917,559 B2* | 2/2024 | Nadakuduti | H04B 1/3838 |
| 2011/0003606 A1* | 1/2011 | Forenza | H04L 25/03343 455/501 |
| 2016/0365886 A1* | 12/2016 | Prendergast | H04W 52/18 |
| 2017/0077977 A1* | 3/2017 | Prendergast | H04B 1/3838 |
| 2018/0070320 A1* | 3/2018 | Forrester | H04W 52/30 |
| 2018/0175944 A1* | 6/2018 | Seyed | H04B 1/3833 |
| 2018/0288709 A1* | 10/2018 | Yao | H04W 52/367 |
| 2019/0296810 A1* | 9/2019 | Forenza | H04W 24/08 |
| 2020/0107274 A1* | 4/2020 | Jadhav | H04W 52/367 |
| 2020/0195336 A1* | 6/2020 | Raghavan | H04B 7/0874 |
| 2022/0159582 A1* | 5/2022 | Lu | H04W 52/36 |

* cited by examiner

1700

METHODS AND DEVICES OF TRANSMIT POWER CONTROL FOR MULTIPLE TRANSCEIVERS IN A SINGLE DEVICE OR IN A MULTIPLE DEVICE SCENARIO

RELATED APPLICATION(S)

This application claims the benefit of EP Patent Application No. 21 208 590.6, filed Nov. 16, 2021, which is incorporated by reference herein in its entirety.

TECHNICAL FIELD

Various aspects relate generally to wireless communications.

BACKGROUND

Advances in wireless technologies have created scenarios with users using one or more devices with each device potentially having multiple radio frequency (RF) transceivers implemented into RF modules capable of communicating via multiple radio access technologies (RATs). For example, a single device may have multiple RF transceivers that may communicate via wireless wide area network (WWAN) or cellular communications, wireless local area network (WLAN) communications, Bluetooth communications, or Near-field Communication (NFC) communications simultaneously. Additionally, multiple transceivers of a device may be configured to communicate via a single RAT (e.g., Fifth Generation (5G) or New Radio (NR) or Wi-Fi) using Multiple-Input Multiple-Output (MIMO) mechanisms. In some scenarios, a user may even be using multiple devices simultaneously (e.g., a cell phone, a laptop, and/or a tablet) or may be in an environment where there are different RF devices operating simultaneously.

These scenarios may expose the user to high levels of RF or electromagnetic (EM) wave energy and can benefit from active management of mutual RF levels to optimize performance and maintain compliance with regulatory requirements. Regulatory bodies such as the Federal Communications Commission (FCC) in the United States or the European Committee for Electrotechnical Standardization (CENELEC) in Europe have introduced regulatory limits, such as specific absorption rate (SAR) or power density restrictions, to limit the amount of RF energy to the user. However, there still is a need and benefit to control and manage the transmit powers across a plurality of RF modules in a terminal device and/or scenarios with multiple devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
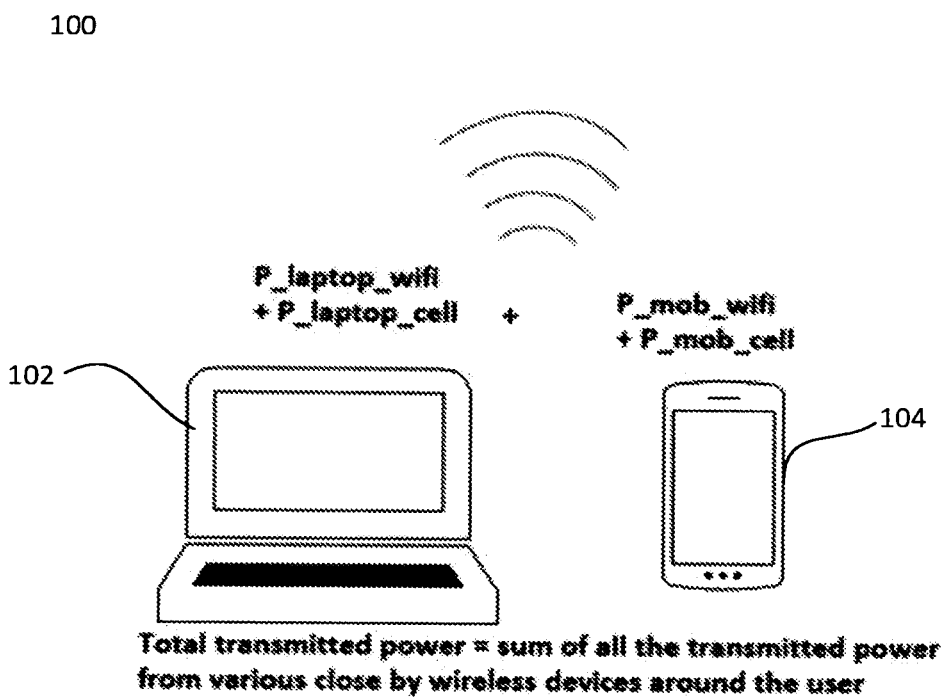
FIG. 1 exemplarily shows an example of a use case scenario with multiple terminal devices having multiple RF transmission modules according to the present disclosure.

The following detailed description refers to the accompanying drawings that show, by way of illustration, specific details, and aspects in which the disclosure may be practiced.

The present disclosure provides devices and methods that implement additional considerations for compliance with RF exposure requirements. In the present disclosure, the transmission power control techniques go beyond simply detecting the presence of a user and adjusting the transmission power of a single transmission module for RF exposure compliance. The devices and methods disclosed herein account for terminal devices with multiple transmission modules (i.e., transceivers or modems) that are simultaneously transmitting before adjusting the transmission powers and/or may also consider a measured RF power in the surrounding environment in which the terminal device is operating in before adjusting the transmission power(s) of the transceiver(s) of the terminal device.

As discussed in the Background section, regulatory bodies and agencies establish regulatory limits and standards intended to reduce RF exposure to users. Device manufacturers must meet these regulatory limits and standards to put devices on the market. The ensuing disclosure provides methods and devices that enhance device performance while ensuring compliance with these regulatory limits and standards.

Transmit Power Control for a Terminal Device in a Multiple Device Radiation Environment Advances in wireless technologies have created scenarios with a single RF device (e.g., a mobile phone, laptop, tablet, wearable, etc.) having multiple wireless transceivers simultaneously transmitting communications and scenarios where there may be multiple active RF devices in close proximity to the user. For example, today's laptop or mobile phone devices include wireless transmitting modules for cellular, WLAN (e.g., Wi-Fi), Bluetooth, or NFC communications. All these wireless devices transmit RF or EM energy around the user.

Exposure to RF/EM wave energy may cause biological effects and different radiation hazards to the human body. National and international regulatory limits are established based on the latest science to manage RF exposure. For example, the FCC in the United States requires that wireless devices must meet the RF exposure standards and regulatory criteria before being produced. These standard and regulatory criteria may include SAR or power density limits. SAR is a measure of the rate at which energy is absorbed per unit mass by a human body when exposed to an electromagnetic field. SAR testing needs to be done to make sure that the product's safety and compliance requirements are met. The SAR for electromagnetic energy is calculated from the electric field as:

$$SAR = \frac{1}{V} \int_{sample} \frac{\sigma(r)|E(r)|^2}{\rho(r)} dr$$

The SAR value depends on the Electric Field (V/m), Conductivity of the Material (S/m), and Mass Density (Kg/m3). The value will depend on the geometry of the part of the body that is exposed to the RF energy and on the exact location and geometry of the RF source.

The SAR level is set to avoid adverse effects to human health. Different countries have different SAR limits, for example: US FCC regulation: SAR level<1.6 W/kg; EU IEC regulation: SAR level<2 W/kg; and India: same as US limits.

FIG. 1 shows an example of a use case scenario 100 with two terminal devices with multiple RF transmission modules according to some aspects. It is appreciated that FIG. 1 is exemplary in nature and may be simplified for purposes of this explanation.

As shown in FIG. 1, a user may be using multiple terminal devices (i.e., user equipments (UEs)) such as a laptop 102 and a mobile phone 104 that are operating in close proximity to the user. Each of devices may have several transmitting sources such as modems corresponding to different radio communication technologies, such as a cellular modem, a WLAN modem, a Bluetooth (BT) modem, etc. For example, laptop 102 and mobile phone 104 may be transmitting using both WLAN (e.g., Wi-Fi) and cellular transmitters. The transmit powers from the wireless transceivers on the laptop side are denoted as "P_laptop_wifi" for WLAN and "P_laptop_cell" for cellular (or WWAN). Similarly, the transmit powers from the wireless transceivers of the mobile phone are denoted as "P_mob_wifi" for WLAN and "P_mob_cell" for cellular (or WWAN).

Many times, the multiple transmitters from the different devices, such as laptop 102 and mobile phone 104, are transmitting simultaneously in different RF operating bands. Due to band separation, the transmission (Tx) signals from each of these transmission modules from the different devices may not be directly interfering with one another. However, the user's radiation health hazard is increased due to exposure to accumulated RF power from the different nearby devices.

Regulatory standards define human exposure limits per device, which can include multiple sources. Prior to transmission from a Tx module or transceiver in a terminal device, the Tx module needs to check the presence of a user body in proximity to the terminal device, typically done via one or more sensors, to meet SAR or power density emissions requirements. The one or more sensors may be mounted near antennas. Based on the detection of a user body, the Tx module may be configured to adjust the Tx power to meet the regulatory requirements. The RF power transmitted from other nearby devices is not considered since regulatory requirements and limits are set on a device-basis and may factor in adding the differing RF sources in the same device to meet these limits. In sum, if each individual transmission module or transceiver (e.g., for cellular or for WLAN) solely adjusts its Tx power level without checking or considering the overall RF power level in the terminal device's environment, then there is a potential risk of increased RF exposure to the user.

In FIG. 1, the overall radiation risk to the user in a multiple device scenario is illustrated as the sum of the transmit powers from the laptop 102 (both Wi-Fi and cellular) and from the mobile phone 104 (both Wi-Fi and cellular). To illustrate this, a use case example is considered with a 5G cellular modem and a Wi-Fi modem in a single terminal device. The Third Generation Partnership Project (3GPP) defines the maximum transmit power levels for a FR1 band user equipment (UE) with power class-2 at 26 dBm and for a FR1 band UE with power class-3 at 23 dBm. The Wi-Fi modem power level is about 17 dBm for the 2.4 GHz band and 16 dBm for the 5 MHz band. If a user has a laptop and a mobile phone, each with a 5G cellular modem and a Wi-Fi modem, in close proximity, and all four transmission modules (i.e., the laptop's cellular modem and Wi-Fi modem, and the mobile phone's cellular modem and Wi-Fi modem) transmit simultaneously, the total radiated RF power (P(total)) around the user may be described as: P (total)=23 dBm+17 dBm+23 dBm+17 dBm, which may be unsafe to the user.

The methods and devices of this disclosure address this problem and provide a solution for better regulatory compliance and performance.

The present disclosure prioritizes RF exposure considerations by not only detecting the presence of a user body via one or more sensors, but by additionally ensuring that the transceivers (e.g., cellular, WLAN, Bluetooth, etc.) consider the overall RF power level in the surrounding environment of the terminal device. This overall RF power level may be attributed to other transceivers in the same terminal device (i.e., referred to as internal to the terminal device) and other RF sources in the terminal device's environment (i.e., referred to as being external to the terminal device). The overall RF power level may be based on multiple RF bands (i.e., not just a single RF band being used by a single transceiver). Accordingly, the present disclosure implements methods and devices that use this additional information when dynamically adjusting the transmission power of one or more transmission modules (i.e., transceivers) so that the overall radiated power level in the operating environment around the user falls within a safe limit. The terminal device can also survey all the Tx modules in its platform and complete a weighted Tx power tuning for an optimal system solution to meet SAR or power density requirements.

In order to implement the methods of the present disclosure, a wideband RF sensor in introduced into the terminal device to monitor the surrounding RF power levels in the terminal device's environment. The present disclosure provides a computation of the total RF power from external sources based on the measurements from wideband RF sensor and a computation for the total power from the internal enabled RF modules of the terminal device. This external and internal RF power information is used, in addition to the detection of a human presence provided by one or more sensors, to adjust the Tx power for all the terminal device's RF transceivers to protect the user from high RF exposure. Furthermore, the present disclosure provides a warning alert to communicate to the user via one or more user interfaces (e.g., a display screen, speaker, notification light, etc.) to inform the user that they are in a high radiation environment as well as recommendations for reducing their RF exposure level.

Advantages of the present disclosure over legacy SAR methods include, but are not limited to, the following:

(1) In the legacy SAR method, only a particular RF module's Tx power is reduced by a defined amount whenever the user proximity to the Tx antenna is detected through a proximity sensor (discussed below in FIG. 2). This may not be a very effective method for RF exposure considerations to the user. In comparison to that, the present disclosure provides mechanisms and schemes to measure the transmit powers from different RF transmitter modules (transceivers) in the same device and the RF power in the surrounding environment. Based on this information, in addition to the detection of a user provided by sensors, the transmit power for different Tx transceivers are computed, which provides a more RF radiation safe environment.

(2) The legacy method does not consider the other simultaneous transmissions from the terminal device's other RF transmitters. On the other hand, the present disclosure accounts for and considers all the terminal device's enabled RF modules when computing the total Tx power for the terminal device. A Tx power exceed value is computed and the new lower Tx power, for each enabled RF module, is calculated by using a weighting factor. That is, the Tx power for each of the enabled RF module is adjusted until the required safe Tx power is reached.

(3) The present disclosure provides better RF exposure considerations for the user.

(4) The present disclosure provides a mechanism for the surrounding RF power level where the user is working to be displayed so that user is aware about the effect.

(5) The present disclosure warns the user in case the user is in proximity with the device and the surrounding RF power level is high.

Figure 2:
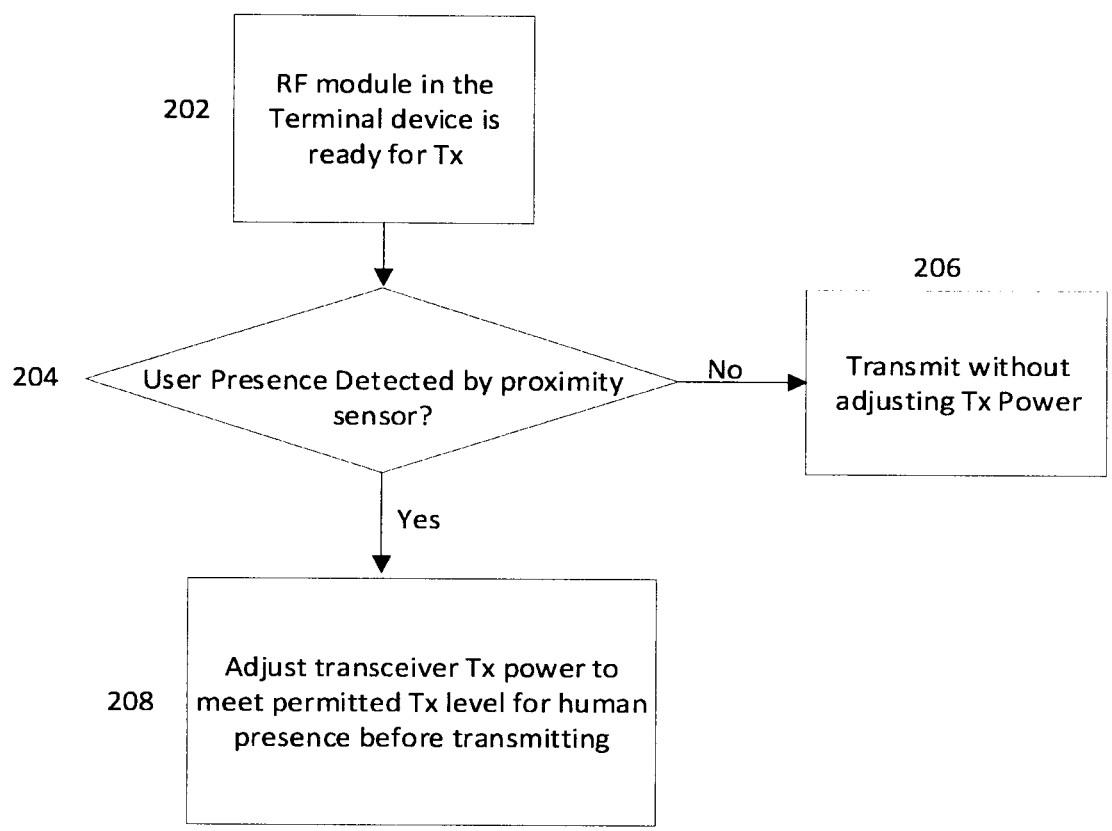
FIG. 2 exemplarily shows a legacy flowchart method.

To better illustrate the comparison between the present disclosure and the legacy method, a flowchart 200 for the legacy method is provided in FIG. 2.

In 202, the RF module in the terminal device is ready for transmission. The RF module may include one or more components such as an antenna, RF transceiver, digital signal processor, and/or a controller for a RAT such as a cellular RAT or a WLAN RAT. In 204, the proximity sensor checks for the presence of a user in close proximity to the device. If there is no human presence located in close proximity to the device (which may include checking for user presence close to the antenna), then the RF module may transmit without adjusting the Tx power 206. However, if there is a user presence detected by the proximity sensor, then the transceiver Tx power is adjusted to meet the permitted Tx level for human presence before transmitting 208. This may include, for example, applying a power back-off to the Tx power based on regulatory SAR or power density regulatory limits. However, the legacy method shown FIG. 2 does not consider other RF modules that may be (simultaneously) transmitting from the same terminal device nor does it consider the RF power level in the surrounding environment.

Figure 3:
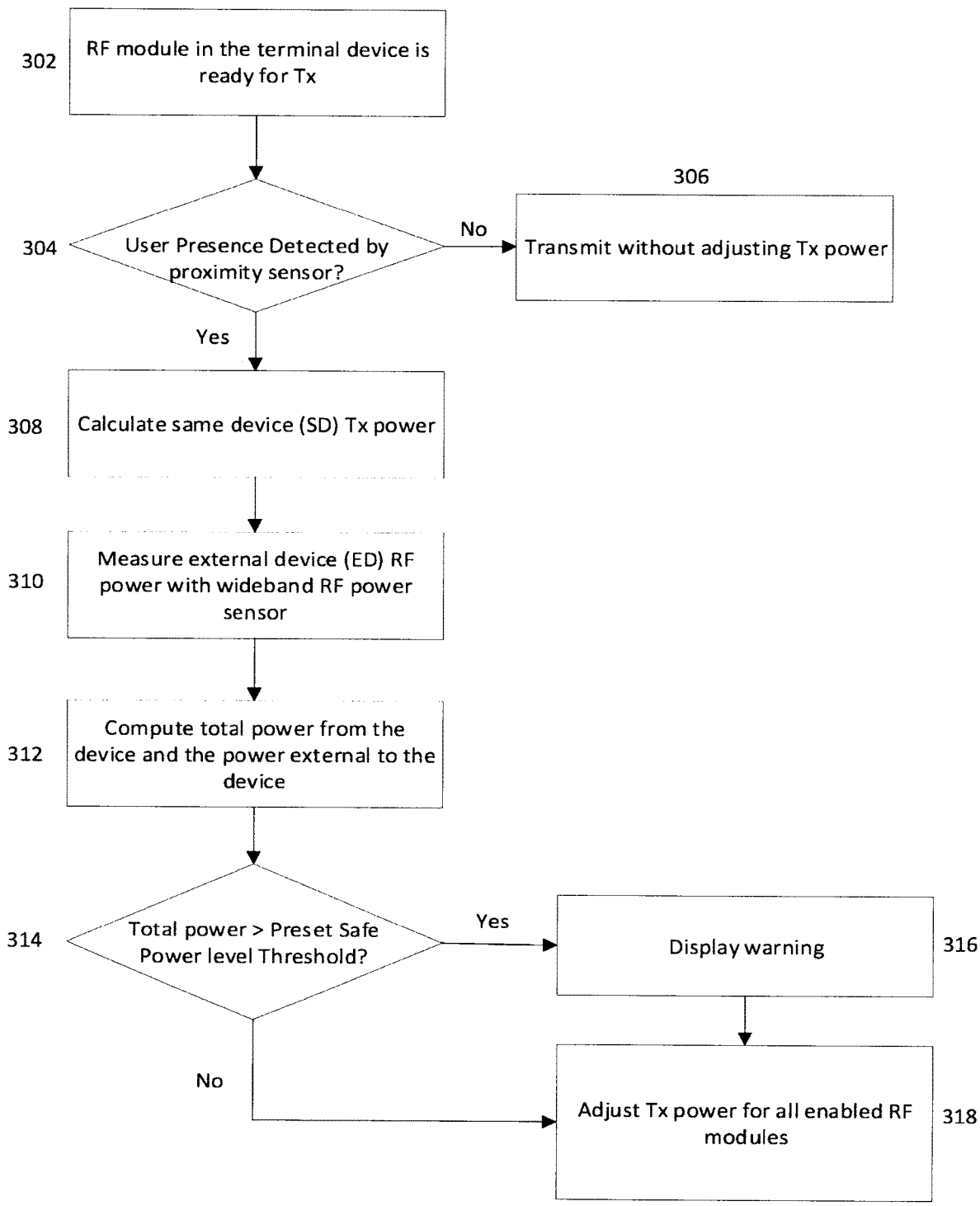
FIG. 3 exemplarily shows a flowchart illustrating a method according to the present disclosure.

FIG. 3 shows a flowchart 300 illustrating a method according to the present disclosure which, in addition to considering the detection of a user by one or more sensors, considers the RF power levels of all the transmitters (i.e., RF modules) in the terminal device (i.e., the same device (SD)) and accounts for the RF power measured in the terminal device's surrounding environment (i.e., the external device (ED) RF power). It is appreciated that flowchart 300 is exemplary in nature and may be simplified for purposes of this explanation.

In 302, an RF module in the terminal device is ready for transmission. Each of the RF modules may include one or more components such as an antenna, RF transceiver, digital signal processor, and/or a controller for a RAT. For example, the RF module may be a cellular modem, WLAN modem, Bluetooth (BT) modem, etc. These RF modules may be enabled to work simultaneously, i.e., transmit at the same time. Whenever any of these RF modules is about to perform a transmission, a check is performed to see if a user is located in close proximity as detected by one or more proximity sensors 304. If there is no human presence located in close proximity to the device (which may include checking for user presence close to the antenna), then the RF module may transmit without adjusting the Tx power 306. However, if there is a user presence detected by the proximity sensor, instead of simply adjusting the Tx power to meet the permitted Tx level for human presence, the present disclosure implements the additional features provided shown in 308-318.

Figure 4:
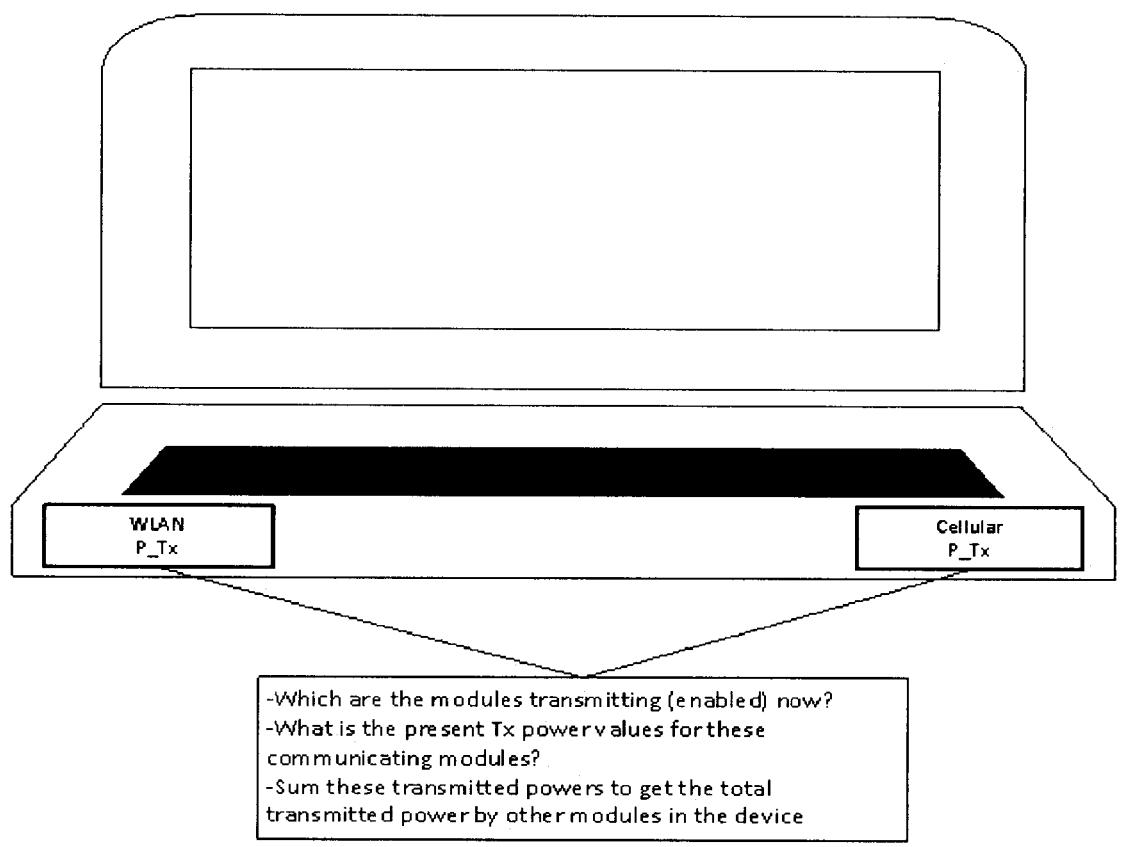
FIG. 4 exemplarily shows a terminal device (in this example, a laptop) with multiple RF transmission modules according to the present disclosure.

After detecting a user proximity in 304, a calculation of the same device (SD) Tx power is performed 308. This includes computing the total transmit power by all the different RF modules in the terminal device, e.g., the transmit powers of the cellular modem, the WLAN modem, the Bluetooth modem, etc., that are transmitting simultaneously. This task may include detecting which RF modules are enabled and actively transmitting and measuring the Tx power from each of the transmitters in the active RF modules. The transmitted power value of each of these RF modules is also known by the system of the terminal device and is illustrated by way of example in FIG. 4 with a cellular modem and a WLAN modem shown as examples. The total RF power from the SD (P_RFTotal_SD) may be computed as: P_RFTotal_SD=(P_cellular+P_WLAN+P_BT+ . . . )_SD.

Figure 5:
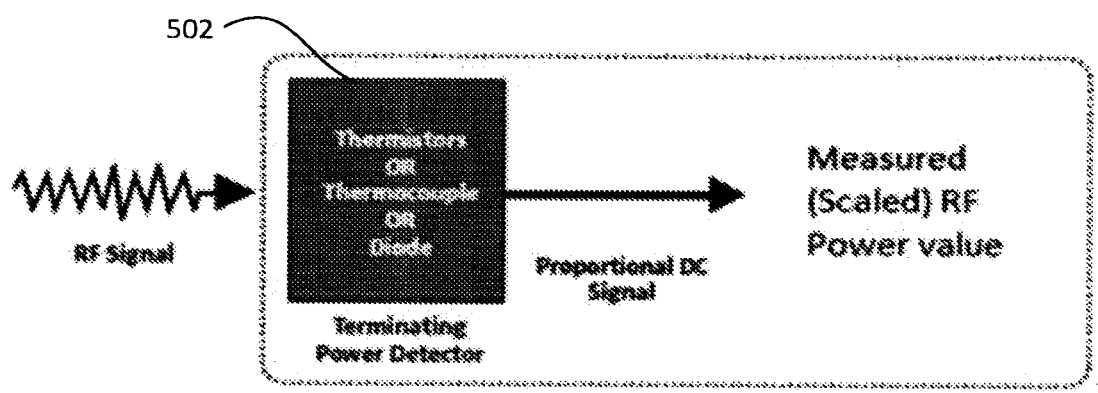
FIG. 5 exemplarily shows a diagram for a wideband RF sensor according to the present disclosure.

Referring back to FIG. 3, in 310, a measurement of the external device (ED) RF power is performed by a wideband RF sensor. The sensor's measured power is appropriately scaled to reflect the total RF power value in the surrounding environment and may be empirically tuned. The wideband RF sensor measures the RF power coming from sources that are external to the terminal device (referred to as external device (ED)) and this power is denoted as P_RFED. The wideband RF sensor may be configured to sweep a wide range of frequencies used by different devices including cellular modems, WLAN modems, handhelds, etc. This range of frequencies may include for example, frequencies in a range as low as 400 MHz, frequencies in the 2.4 GHz-5 GHz range to account for WLAN and BT frequency bands, frequencies in the range of 24-47 GHz for 5G bands, frequencies in the range of 60 GHz for WiGig frequency bands, for example. An exemplary diagram for the wideband RF sensor (i.e., wideband RF power sensor or the like) is shown in FIG. 5. The wideband RF sensor 500 may be configured to receive RF signals at a terminating power detector 502 which may include thermistors, thermocouples, and/or diodes. Based on the received RF signals, the terminating power detector 502 produces a direct current (DC) signal that is proportional to the received RF signals as a measured (scaled) RF power value, or the P_RFED.

In some aspects, this surrounding RF power value (P_RFED) may be communicated to the user, e.g., via a notification on the display screen. This may include comparing the surrounding RF power level with a reference RF safety reference power level. If the safety reference power level is exceeded, then a warning alert is displayed, and a suggestion is given to change the user location, e.g., recommend to the user to move to a lower RF energy place to avoid radiation hazard.

Referring back to FIG. 3, in 312, the total RF power that the user is exposed to is computed. The total RF power (P_RF_ALL) may be based on one or more of the total RF power from the SD (P_RFTotal_SD, i.e., the total Tx power from all the RF modules of the terminal device) and/or the surrounding RF power value (P_RFED) measured by the wideband RF sensor. In some aspects, the total RF power (P_RF_ALL) may be computed by adding the measured surrounding RF power (P_RFED) with the total TX power from the RF modules of the terminal device (P_RFTotal_SD). In other aspects, the total RF power (P_RF_ALL) may be computed based on the measured surrounding RF power (P_RFED), and then the total TX power from the RF modules of the terminal device (P_RFTotal_SD) can be subtracted from the P_RFED value to obtain a true value of the RF power attributed solely to external devices. In this sense, the measurements of the wideband RF sensor may measure all the RF activity in the terminal device's surroundings, including the RF transmissions from the terminal device itself, and may cancel out the known Tx power quantities of the terminal device's own transmissions to obtain the RF power value attributed solely to external devices.

In 314, the total RF power (P_RF_ALL) is compared to a preset safe power level threshold (Safe_Tx_Power). This threshold may be a threshold reference power based on a regulatory limit and may be a safe power value when the user is in close proximity or contact with the terminal device or its antennas. The difference between these two values gives the Tx power exceed limit, i.e., Tx_Power_Exceed= (P_RF_ALL)−(Safe_Tx_Power).

If the total RF power (P_RF_ALL) is greater than the safe power level threshold (Safe_Tx_Power), i.e., if Tx_Power_Exceed is positive, then a warning alert way be displayed to the user 316. Then, the Tx Power for all enabled (i.e., currently transmitting) RF modules is adjusted accordingly in 318. The Tx power exceed (Tx_Power_Exceed) value, which is now known, needs to be reduced by several concurrently operating RF modules in the terminal device. A weighting factor is used to decide the Tx power reduction for each enabled RF module (e.g., cellular/WWAN modem, WLAN modem, etc.). The weighting factor (wn, where n corresponds to each enabled RF module) may assigned by the user based on the importance of the RF modules of various wireless networks or they may be assigned based on network configurations. So, after applying the above method the total RF power in the user surrounding will be: RF power (P_RF_ALL) exposed to User=((P_cellular−w1)+ (P_WLAN−w2)+(P_BT−w3)+ . . . )_SD+P_RFED, where w1+w2+w3+ . . . =Tx_Power_Exceed. Each of the RF modules' Tx power is then adjusted accordingly prior to transmission.

Figure 6:
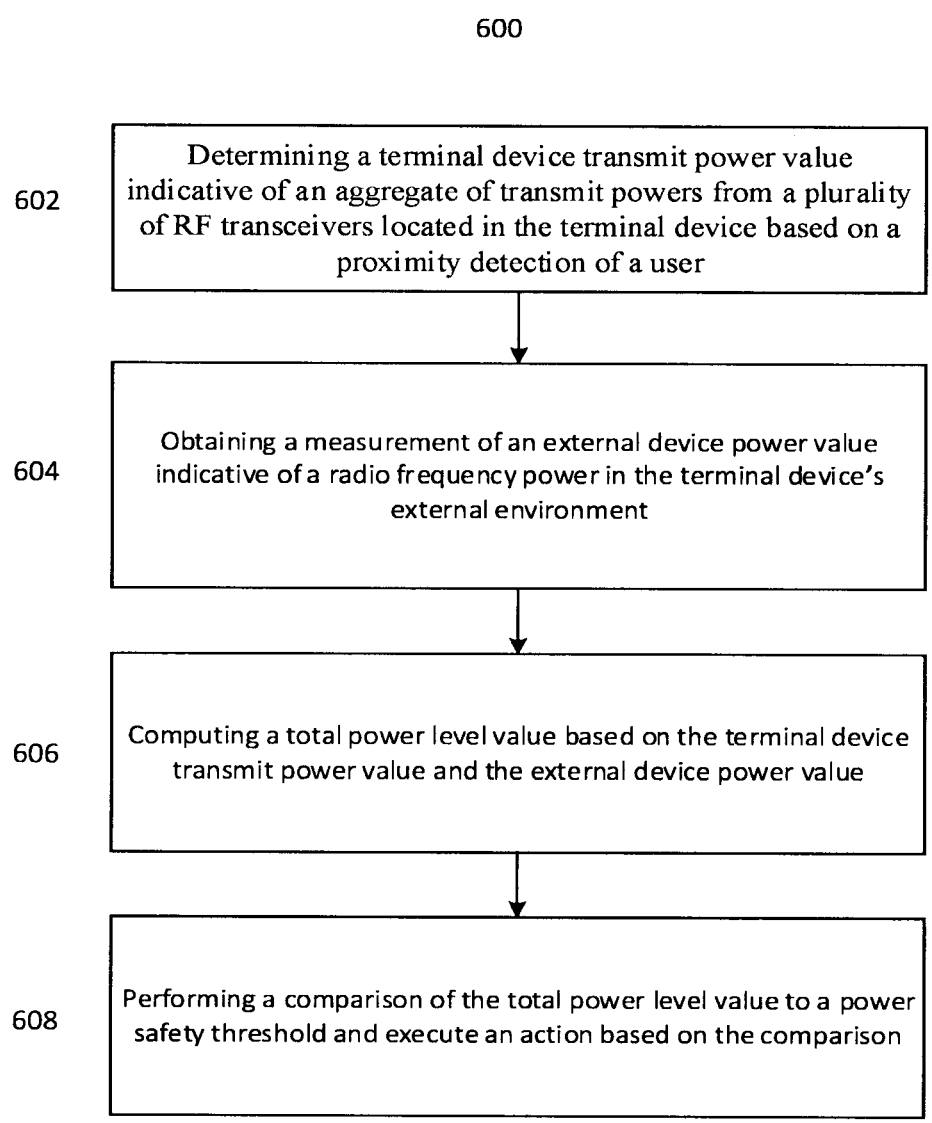
FIG. 6 exemplarily shows a flowchart for device operation according to the present disclosure.

FIG. 6 is a flowchart 600 illustrating a method for device operation according to some aspects. The device may include one or more processors and one or more non-transitory computer readable media with programmable instructions to cause the one or more processors to execute the method described below. It is appreciated that flowchart 600 may be simplified for purposes of this explanation.

In 602, the device may determine a terminal device transmit power value indicative of an aggregate of transmit powers from a plurality of radio frequency transceivers located in a terminal device based on a proximity detection of a user. The plurality of radio frequency transceivers may include one or more of a cellular transceiver (or cellular RF module), WLAN transceiver (or WLAN RF module), a BT transceiver (or BT RF module), or an NFC transceiver (or NFC RF module). The terminal device transmit power value may be based on the plurality of radio frequency transceivers that are currently transmitting (enabled).

In 604, the device may obtain a measurement of an external device power value indicative of a radio frequency power in the terminal device's external environment. The measurement of the external device power may be performed by a wideband RF power sensor mounted in the terminal device and coupled to the processor, where the wideband RF sensor provides the measurement of the external device power to the processor. The wideband RF sensor may be configured to measure a range of frequencies including cellular frequencies, WLAN frequencies, Bluetooth frequencies, or NFC frequencies.

In 606, the device may compute a total power level value based on at least one of the terminal device transmit power value and/or the external device power value.

In 608, the device may perform a comparison of the total power level value to a power safety threshold and execute an action based on the comparison.

In a first scenario, the comparison includes determining that the total power level value being greater than the power safety threshold. The first scenario may also include the action may include issuing a warning and indicating the total power level value through a user interface. The first scenario may also include the action includes adjusting a transmit power for one or more of the plurality of radio frequency transceivers based on a difference between the total power level value and the power safety threshold. The first scenario may also include reducing the difference between the total power level value and the power safety threshold by reducing a transmit power of one or more of the plurality of radio frequency transceivers. The first scenario may also include that the transmit power of each of the plurality of radio frequency transceivers is reduced by a weighted amount based on a priority of each of the plurality of radio frequency transceivers, where the transmit power of higher priority radio frequency transceivers is reduced by a lower amount proportional to lower priority radio frequency transceivers.

In a second scenario, the comparison includes the total power level value being less than the power safety threshold. The second scenario may also include the action includes adjusting a transmit power for one of more of the plurality of radio frequency transceivers based on a difference between the total power level value and the power safety threshold. The second scenario may also include to reducing the difference between the total power level value and the power safety threshold by increasing the transmit power of one or more of the plurality of radio frequency transceivers. The second scenario may also include that the transmit power of each of the plurality of radio frequency transceivers is increased by a weighted amount up to a maximum allowable transmit power based on a priority of each of the plurality of radio frequency transceivers, where the transmit power of higher priority radio frequency transceivers is prioritized over, or increased by a greater amount proportional to, lower priority radio frequency transceivers.

After performing the method shown in flowchart 600, the device may then be configured to generate a transmission based on the action.

Figure 7:
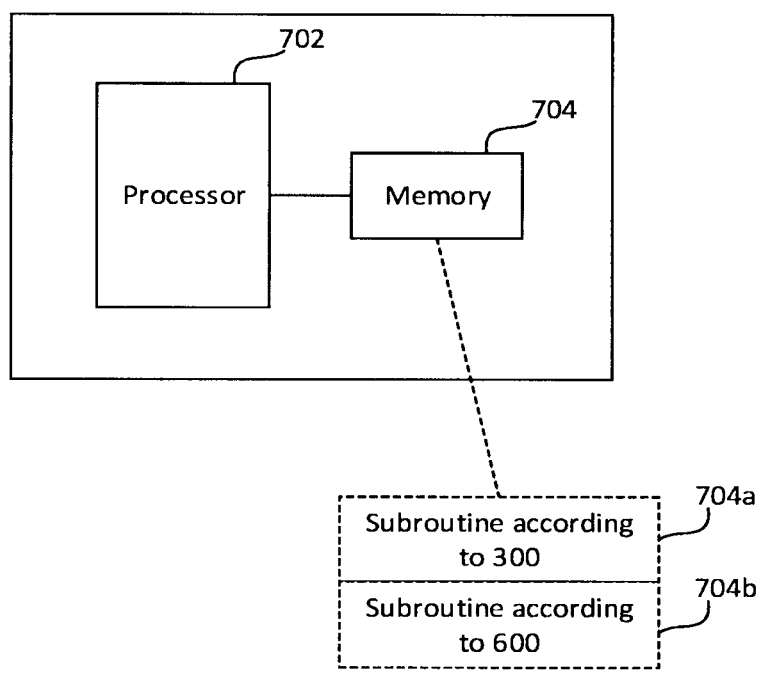
FIG. 7 exemplarily shows an internal configuration of device according to the present disclosure.

FIG. 7 shows an exemplary internal configuration of device 700 according to some aspects, which may be included in a UE or a terminal device to implement the methods and algorithms of this disclosure. As shown in FIG. 7, device 700 may include processor 902 and memory 904. Processor 902 may be a single processor or multiple processors and may be configured to retrieve and execute program code to perform the transmission and reception, channel resource allocation, and cluster management as described herein. Processor 902 may transmit and receive data over a software-level connection that is physically transmitted as wireless radio signals by a digital signal processor, RF transceiver, and an antenna system. Memory 904 may be a non-transitory computer readable medium storing instructions for one or more of a subroutine 704a which include instructions to execute a method according to flowchart 300 and its corresponding description; and/or subroutine 704b which includes instructions to execute a method according to flowchart 300 and its corresponding description.

Transmit Power Control for Multi-Technologies and Multi-Antennas in a Terminal Device Traditionally, SAR or power density (collectively referred to as "RF exposure") compliance is managed by detecting when RF exposure may exceed specified limits. The SAR exposure to a user may be reduced by static power reduction through the use of look-up tables. As previously discussed, devices typically use proximity sensors to detect the physical proximity of users to the antenna and reduce the power of a transmitter accordingly.

Furthermore, some implementations apply time-averaging SAR (TA-SAR) in real-time to maintain RF exposure compliance with more practical and realistic SAR or power density management. Current devices, however, only apply SAR or power density mitigation techniques for one antenna or one RAT and fail to consider scenarios in which multiple antennas may be transmitting simultaneously. In other words, current devices fail to address simultaneous or coexistent transmissions in the SAR or power density assessment which may sometimes lead to an additional power reduction especially if the transmission antennas in the device are physically close to one another.

The present disclosure identifies that in some scenarios, they may be an additional power reduction that may be needed to be applied to multiple antennas in a single device to maintain compliance with RF exposure regulations. The present disclosure provides a device and an algorithm that presents a management strategy and methodology allowing the RF exposure mitigation of multi-antenna and/or multi-RAT transmissions when a power reduction is required to address simultaneous transmission across multiple antennas, thereby ensuring better performance while complying with RF exposure regulations and standards.

The present disclosure presents an algorithm of power balance for simultaneous transmissions for multiple RATs/antenna transmission which may be further combined with a TA-SAR algorithm. A centralized RF exposure manager is implemented that tracks the system workload and/or network traffic information of multiple RATs and handles the simultaneous RF exposure transmission across multiple transmitting antennas. The centralized RF exposure manager is implemented in addition to the RF exposure manager (i.e., SAR or power density manager, for example) of the transmission modules (e.g., WLAN modem, WWAN modem, BT modem, NFC modem, etc.) to provide an additional layer of RF exposure management.

Advantages of the present disclosure include improved product performance and network capacity efficiency as well as allowing additional performance optimization in coexistence scenarios where an additional power back-off is needed to maintain compliance in case of simultaneous transmissions.

The methodology presented and discussed with respect to the following figures and description covers all possible simultaneous transmission between the same technology (e.g., via MIMO techniques) or different RAT coexistence (e.g., WLAN and WWAN). Additionally, the methodology applies when an additional power reduction is related to simultaneous transmission for high power and/or close antenna distances.

Figure 8:
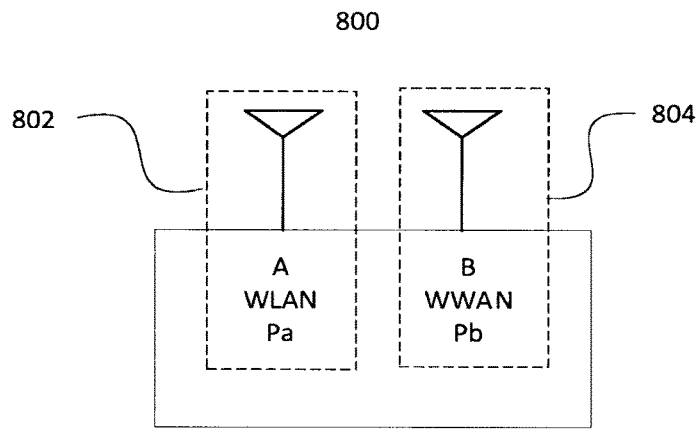
FIG. 8 exemplarily shows a diagram of a device with two antennas and according to some aspects of the present disclosure.

FIG. 8 shows a diagram of a device 800 with two antennas 802 and 804 according to some aspects of the present disclosure. Although two antennas are shown, it is appreciated other numbers of antennas (e.g., 3 or more) are also possible and thus covered by the ensuing explanation. Device 800 is intended to be exemplary in nature and serve as an illustration for purposes of discussing the parameters of the algorithm presented in FIGS. 14 and 15.

The first antenna 802 is labeled Antenna A and may be capable of transmitting via a first RAT, e.g., WLAN as shown in FIG. 8. "Pa" is the power for Antenna A for non-simultaneous transmission, i.e., the maximum transmission power allowed on Antenna A. The second antenna 804 is labeled Antenna B and may be capable of transmitting via a second RAT, e.g., WWAN (or cellular) as shown in FIG. 8. "Pb" is the power for Antenna B for non-simultaneous transmission, i.e., the maximum transmission power allowed on Antenna B.

Although the first antenna 802 is illustrated as being a WLAN antenna and the second antenna 804 is illustrated as being WWAN antenna, it is appreciated that other configurations (e.g., both antennas transmitted via a same RAT in a MIMO setup) may be applicable.

"K" is the power reduction required for the specific simultaneous transmission and may be determined based on regulatory considerations for simultaneous transmissions. For example, for device 800, if Pa and Pb are added and their sum exceeds the regulatory limit, then "K" is the value by which the sum exceeds the regulatory limit. For example, if the regulatory limit for simultaneous transmission is 27 dBm, and Pa is 18 dBm and Pb is 15 dBm, then K=6 dBm. Furthermore, as "Ka" is the amount of reduction on Antenna A and "Kb" is the amount of reduction on Antenna B, Ka+Kb=K.

In addition to covering scenarios of where a power reduction is required due to simultaneous transmission, the present disclosure also may be implemented in conjunction with the application of TA-SAR methods.

Figure 9:
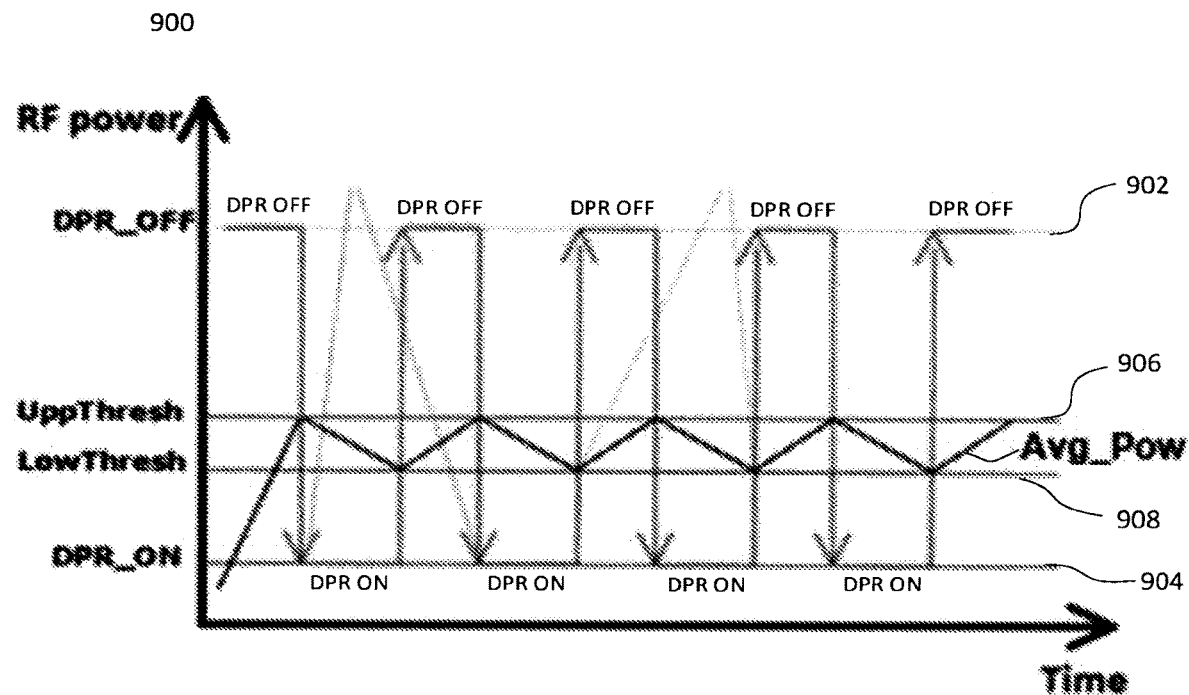
FIG. 9 exemplarily shows a graph illustrating several time-averaging (TA)-SAR parameters used in the present disclosure.

FIG. 9 shows a graph 900 illustrating several TA-SAR parameters used in the present disclosure. Graph 900 plots the RF power (y-axis) vs time (x-axis) to provide an illustration of the description of the TA-SAR parameters. It is appreciated that graph 900 is exemplary in nature and may thus be simplified for purposes of this explanation.

The TA-SAR algorithm uses a sliding time window to calculate the average power (Avg_Pow) of an RF transmission module (e.g., a WLAN or WWAN modem) during a given averaging time (Ta) defined by regulatory requirements. For example, the FCC provides Ta=100 seconds for frequencies below 3 GHz. The average power is calculated each check period (Tr) defining the resolution or granularity. Two levels of maximum power are enforced by the TA-SAR algorithm according to the upper power threshold (denoted herein as Upp_Th or UppThresh or UpThr) and lower power threshold (denoted herein as Low_Th or LowThresh or LowTh). The maximum power level in Dynamic Power Reduction (DPR) state is noted DPR_ON and in the non-DPR states is noted DPR_OFF. $Upp\_Th_a$ and $Upp\_Th_b$ are the upper threshold parameters on Antenna A and Antenna B, respectively. Similar notation is used for other parameters.

As shown in graph 900, the device commences in DPR_OFF state 902 (i.e., maximum transmit power) as the Avg_Pow is below the UppThresh 906. Once the Avg_Pow reaches or surpasses the Upp_Thresh 906, then DPR_ON 904 is triggered, i.e., a power back-off is applied. This causes the Avg_Pow to fall since the transmitting power is reduced. Once the Avg_Pow reaches or falls below the LowThresh 908, then DPR_OFF 902 is triggered, i.e., the power back-off of DPR_ON is removed. By applying and removing the DPR in this manner, the TA-SAR algorithm attempts to maintain the Avg_Pow between the UppThresh and LowThresh for regulatory RF exposure compliance when a user body is detected in close proximity to the terminal device or its antenna(s).

Figure 11:
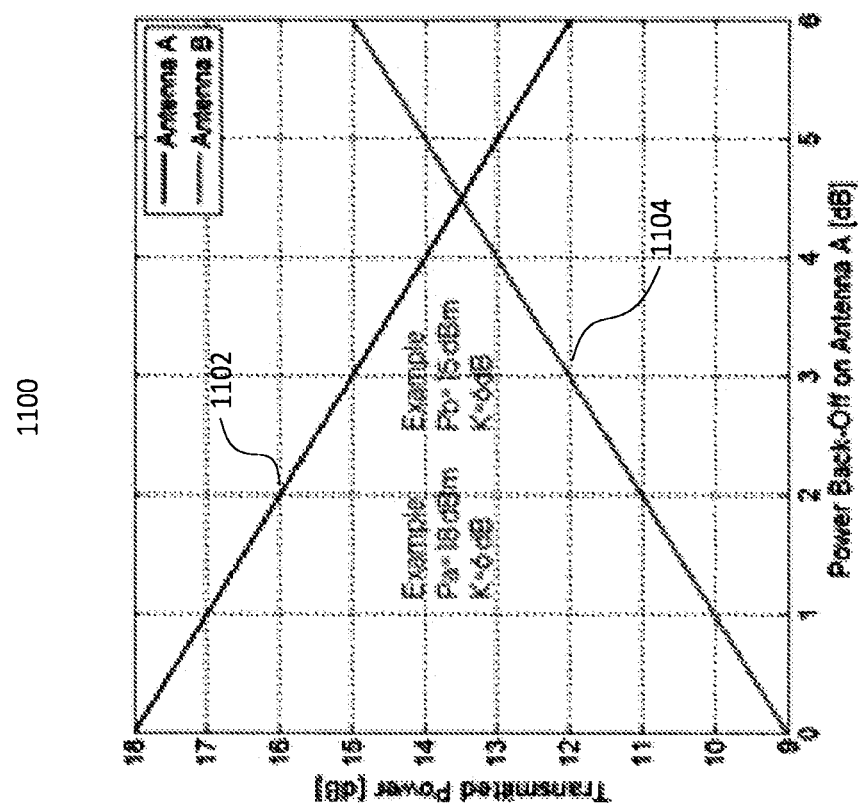
FIG. 11 exemplarily shows a chart illustrating the calculation of the parameters to use for the power reduction balance according to the present disclosure.
Figure 10:
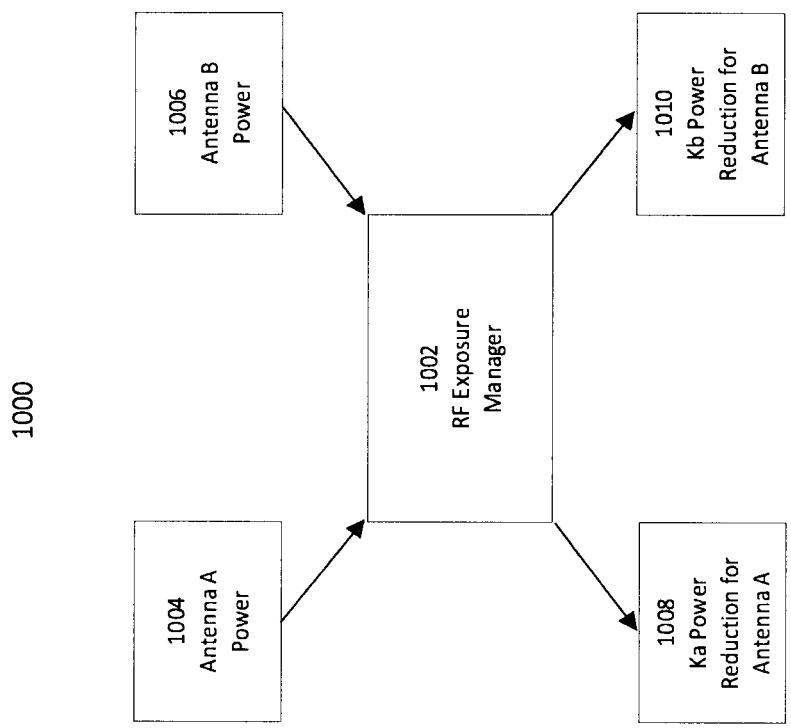
FIG. 10 exemplarily shows a schematic diagram for an RF Exposure Manager according to the present disclosure.

FIG. 10 shows a schematic diagram 1000 for an RF Exposure Manager according to the present disclosure. FIG. 11 shows a chart 1100 exemplarily illustrating the calculation of the parameters to use for the power reduction balance according to the present disclosure. It is appreciated that both schematic diagram 1000 and graph 1100 are exemplary in nature and be simplified for purposes of this explanation. FIGS. 10 and 11 show a power reduction balance technique without TA-SAR being applied.

The power reduction to be applied to two RF transmission modules (e.g., WWAN modem or WLAN modem) that are transmitting simultaneously is decided by the RF exposure manager 1002, which may be implemented in a baseband processor or other signal processing component of a terminal device. The RF exposure manager 1002 acts as a centralized entity which monitors and provides the respective amounts of the power reduction to be applied to each of the antennas via each antenna's respective RF transmission module.

The RF exposure manager 1002 monitors the transmit power for each of a plurality of transmitters, e.g., it tracks the transmit power for Antenna A 1004 and the transmit power for Antenna B 1006. The monitored transmit power may be a requested power based on the network traffic for the RAT being communicated from each of Antenna A and Antenna B, respectively. The RF exposure manager 1002 may then determine a transmit power reduction (i.e., K) for the specific simultaneous transmission based on the total simultaneous transmit power of the plurality of transmitters (i.e., the total transmit power for Antenna A and Antenna B at a same given time) exceeding a threshold. The threshold may be, for example, based on a regulatory limit for transmission power for simultaneous transmissions from a device. The RF exposure manager 1002 then defines a respective amount of the transmit power reduction (i.e., K) to be applied to each transmitter of the plurality of transmitters. For example, RF exposure manager 1002 may apply Ka power reduction for Antenna A 1008 and may apply Kb power reduction for Antenna B 1010, where K is the total power reduction, i.e., Ka+Kb=K. The granularity (i.e., the periodicity, G) is defined according to the implementation constraints and reasonable network power monitoring. This may depend on several factors such as the transmission times of the respective RAT (e.g., frame times) and/or performance goals. The determination of the respective amounts of the transmit power reduction to be applied to each transmitter/antenna (i.e., Ka and Kb in this example) may be based on one or more parameters, including: a priority of a radio access technology being communicated from each transmitter of the plurality of transmitters; a transmission signal quality value corresponding to each of the plurality of transmitters; a performance metric for transmissions being transmitted from each of the plurality of transmitters; or a network traffic information or system workload for a radio access technology being communicated via each of the plurality of transmitters. For example, the distribution of Ka in 1008 and Kb in 1010 may be based on the RATs themselves (e.g., WWAN on Antenna A may have a higher priority for transmissions than WLAN on Antenna B), other assigned priorities of the transmitters/antennas, and/or performance of the device (e.g., WWAN is high priority if by the edge of the cell, therefore requiring higher transmit power). A similar power reduction balance is applicable for two antennas transmitting a same RAT in a MIMO configuration.

Graph 1100 shows a plot of transmitted power in dB versus the power back-off on Antenna A in dB. Line 1102 illustrates the transmit power for Antenna A and Line 1104 illustrates the antenna power for Antenna B. In this example, Pa is 18 dBm (i.e., the maximum transmit power on Antenna A for non-simultaneous transmission), Pb is 15 dBm (i.e., the maximum transmit power on Antenna A for non-simultaneous transmission), and K (i.e., the transmit power reduction to be applied to the plurality of transmitters/antennas based on the total simultaneous transmit power of the plurality of transmitters exceeding a threshold) is 6 dB. This value of K may be computed, for example, if the regulatory limit for simultaneous transmission is 27 dBm and if both Antenna A and Antenna B are transmitting at maximum transmit power (18 dBm for Pa and 15 dBm for Pb) when a user is detected to be in close proximity by the one or more sensors, thereby triggering the power reduction scheme across multiple simultaneously active transmitters as discussed herein.

Figure 13:
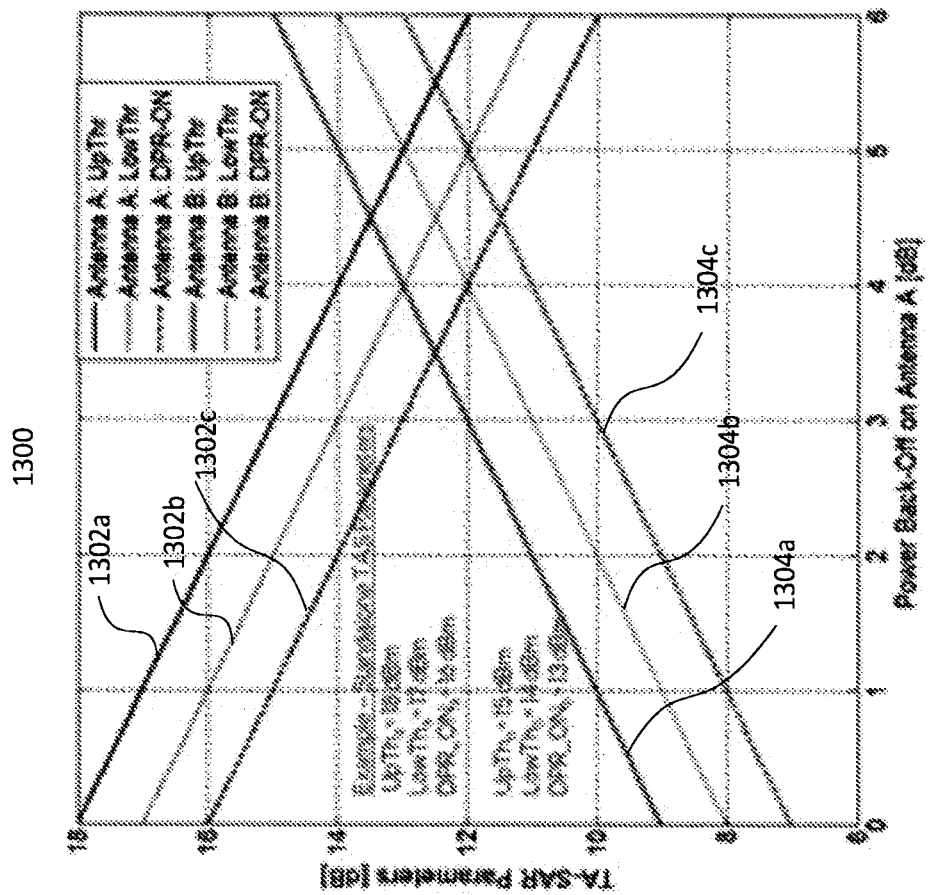
FIG. 13 exemplarily shows a chart illustrating the calculation of the parameters to use for the power reduction balance with TA-SAR being applied according to the present disclosure.
Figure 12:
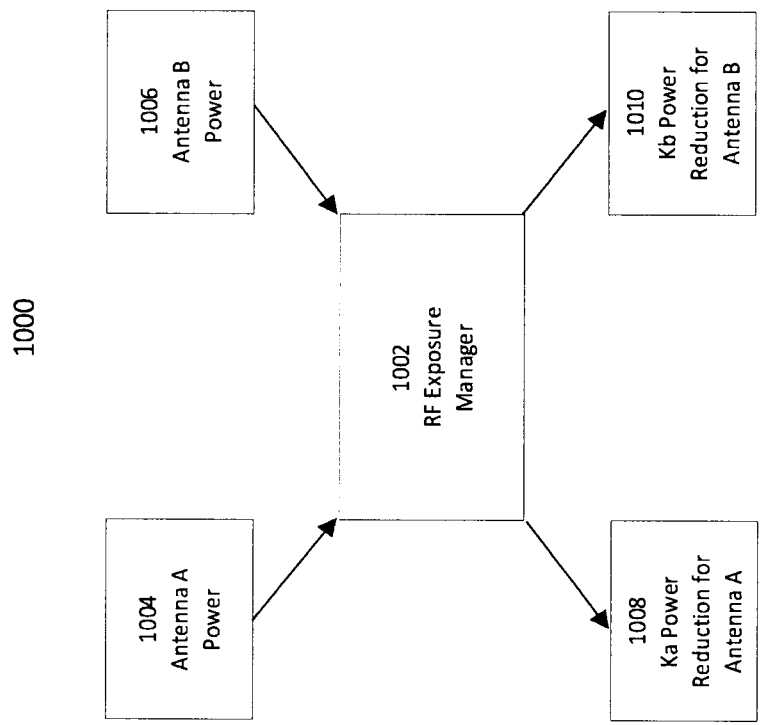
FIG. 12 exemplarily shows a similar schematic diagram of the RF Exposure Manager similar to that shown in FIG. 10.

Since K=6 dB, a 6 dB power reduction must be applied across Antenna A and Antenna B to comply with the regulatory limit for simultaneous transmission. For example, if a 2 dB is applied to Antenna A, then the adjusted transmit power to Antenna A is Pa−Ka=18−2 dB=16 dB, and the remaining 4 dB is applied to Antenna B so that the adjusted transmit power of Antenna B is Pb−Kb=15−4 dB=11 dB. In another example, if Antenna A is being used to communicate via a WWAN or cellular RAT such as 4G or 5G and the terminal device is near the edge of the cell, then a 0 dB may be applied to Antenna A and all 6 dB of the power reduction may be applied to Antenna B (i.e., Ka=0 and Kb=6 dB). Therefore, the adjusted transmission power for each antenna once the respective amount of transmit power reduction applied to each of Antenna A and Antenna B is, respectively: Pa−Ka=18−0 dB=18 dB for Antenna A, and Pb−Kb=15−6 dB=9 dB for Antenna B FIG. 12 shows a similar schematic diagram 1000 of the RF Exposure Manager similar to that shown in FIG. 10. FIG. 13 shows a chart 1300 exemplarily illustrating the calculation of the parameters to use for the power reduction balance with TA-SAR being applied according to the present disclosure. It is appreciated that both schematic diagram 1000 and graph 1300 are exemplary in nature and be simplified for purposes of this explanation.

The concept for FIGS. 12 and 13 is similar to the concept shown in FIGS. 10-11 with the added parameters for TA-SAR. Accordingly, depending on which of the TA-SAR parameters is being applied at the respective moment of the simultaneous transmissions for Antenna A and Antenna B, the values for the respective amount of the transmit power reduction (i.e., power backoffs Ka and Kb) to be applied to each respective transmitter (Antenna A and Antenna B) is applied to one of the upper threshold (UpThr), lower threshold (LowThr), or the DPR-ON value (DPR-ON) for Antenna A and/or Antenna B. The upper and lower threshold and the DPR-ON value were discussed previously in FIG. 9.

In graph 1300, lines 1302a-1302c correspond to the TA-SAR parameters for Antenna A and include the upper threshold (UpThr) illustrated by line 1302a, the lower threshold (LowThr) illustrated by line 1302b, and the DPR-ON value for transmit power for Antenna A illustrated by line 1302c. Lines 1304a-1304c correspond to the TA-SAR parameters for Antenna B and include the upper threshold (UpThr) illustrated by line 1304a, the lower threshold (LowThr) illustrated by line 1304b, and the DPR-ON value for transmit power for Antenna A illustrated by line 1304c. In graph 1300, K=6 dB similar to that described in graph 1100 with the difference being that the respective amounts (i.e., Ka and Kb) of the power reduction (K) are applied to the upper threshold, lower threshold, or DPR-ON value based on which of these parameters is being utilized by the TA-SAR algorithm during the simultaneous transmission (discussed more in detail in the following figure).

Figure 14:
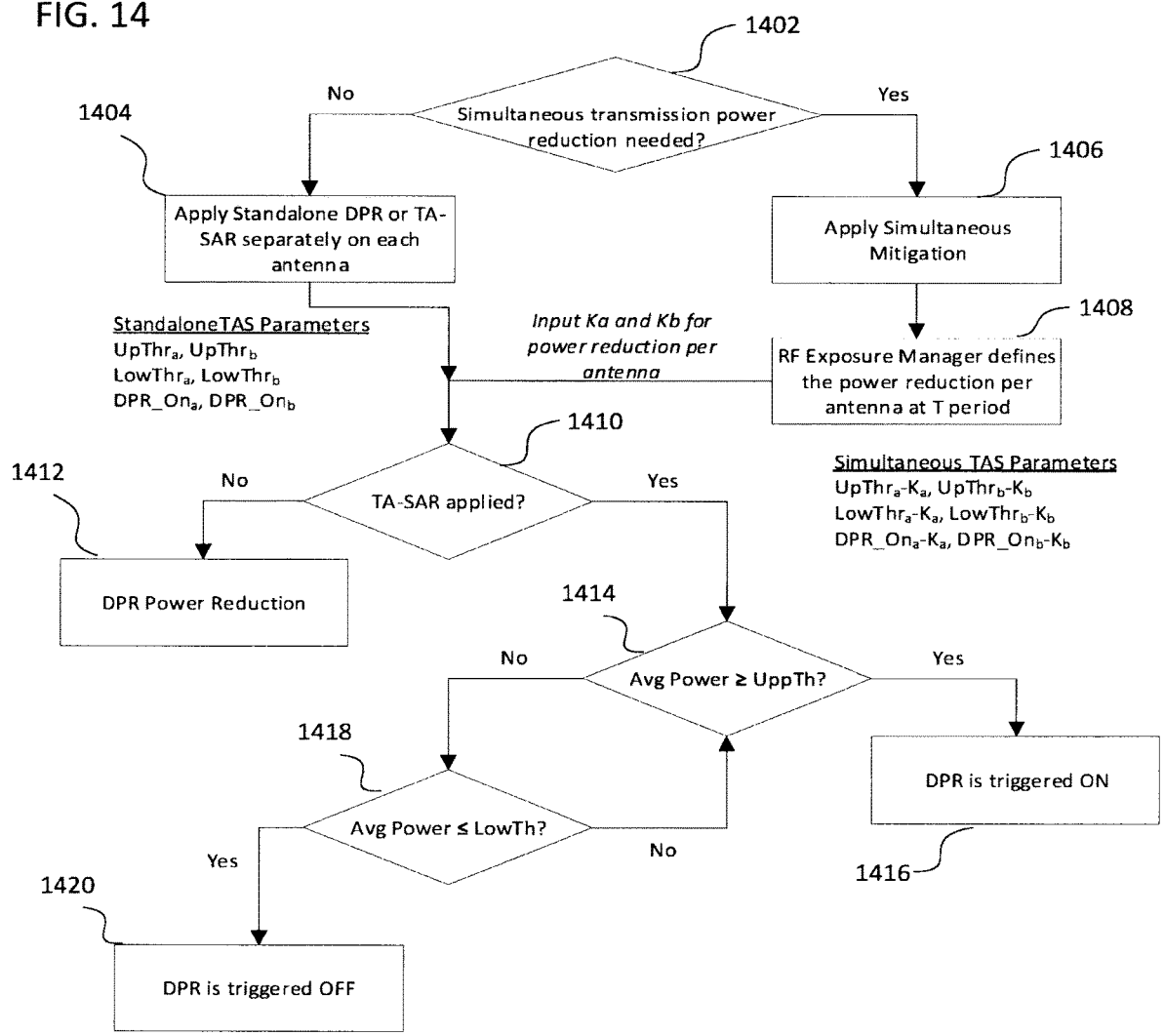
FIG. 14 exemplarily shows a flowchart for a method for power reduction according to the present disclosure, FIG. 15 exemplarily shows a flowchart illustrating a method for device operation according to some aspects.

FIG. 14 shows a flowchart 1400 for a method for power reduction according to the present disclosure. It is appreciated that flowchart 1400 is exemplary in nature and may thus be simplified for purposes of this explanation. For example, the ensuing explanation of flowchart 1400 includes a description for two RF transmission modules each transmitting via its own antenna (e.g., Antenna A and Antenna B), but it is appreciated that the method may be scalable to cover other numbers of RF transmission modules.

In 1402, the decision whether simultaneous transmission power reduction is needed is performed. This decision may be based on monitoring a plurality of transmitters of a plurality of RF transmission modules (e.g., WWAN or WLAN modems) that are transmitting at the same time and based on whether the total simultaneous transmit power of the plurality of transmitters exceeds a threshold such as one established by regulatory considerations for RF power exposure to a user. The decision may be made by an RF exposure manager as previously discussed, which may be implemented by hardware and/or software in the digital signal processor or protocol controller of a baseband processor. The RF exposure manager monitors the transmit power of each of a plurality of transmitters (e.g., a first transmitter which may be part of a WLAN modem, a second transmitter which may be part of a WWAN modem, etc.).

If simultaneous power reduction is not needed, then standalone DPR or TA-SAR may be applied separately on each antenna 1404.

After 1404, for the standalone DPR or TA-SAR per antenna process, the decision whether to apply TA-SAR is made in 1410. This may be based on the detection of a user by one or more sensors or other factors. If TA-SAR is not applied, then DPR Power reduction is used 1412. If TA-SAR is applied, then the process proceeds to 1414. The TA-SAR process provided in 1414-1420 is then performed by the individual transmitter or RAT transmission module (e.g., WLAN modem or WWAN modem) for its respective antenna. The standalone power reduction parameters include $UpThr_a$, $UpThr_b$, $LowThr_a$, $LowThr_b$, $DPR\_On_a$, and $DPR\_On_b$.

Referring back to the decision in 1402, if simultaneous transmission power reduction is needed, then the simultaneous mitigation techniques is applied 1406. This may include determining a transmit power reduction (i.e., K) to be applied to the plurality of transmitters based on a total simultaneous transmit power of the plurality of transmitters exceeding a threshold, which may be based on regulatory considerations. The RF exposure manager defines the power reduction per antenna at a time (T) period 1408. This includes allocating a respective amount of the transmit power reduction to be applied to each transmitter of the plurality of transmitters based on one or more parameters. These one or more parameters may include: a priority of a radio access technology being communicated from each transmitter of the plurality of transmitters; a transmission signal quality value corresponding to each of the plurality of transmitters; a performance metric for transmissions being transmitted from each of the plurality of transmitters; or a network traffic information or system workload for a radio access technology being communicated via each of the plurality of transmitters. The simultaneous TAS parameters include: $UpThr_a-K_a$, $UpThr_b-K_b$, $LowThr_a-K_a$, $LowThr_b-K_b$, $DPR\_On_a-K_a$, and $DPR\_On_b-K_b$.

The steps of 1402-1408 are performed by a centralized RF exposure manager that monitors the transmit power of each of a plurality of transmitters (e.g., WWAN transmitter, WLAN transmitter, etc.), determines the transmit power reduction to be applied to the plurality of transmitters based on a total simultaneous transmit power of the plurality of transmitters exceeding a threshold, and defines a respective amount of the transmit power reduction to be applied to each of the transmitters. The centralized RF exposure manager may be implemented by hardware, software, or combination thereof, and may work in connection with each of the transmitters and their corresponding RF transmission modules, i.e., the centralized RF exposure manager operates to oversee each of the WWAN modem, WLAN modem, and other RAT modems by monitoring the transmit powers of each of the modems and directing them to utilize their respective amounts of the transmit power reduction accordingly.

After determining the respective amount of the power reduction per antenna at a given time period (T) in 1408, the respective amounts of the transmit power reduction (e.g., Ka and Kb) are provided to each of the RF transmission modules.

After 1408, the decision to apply TA-SAR with the simultaneous TAS parameters is performed 1410.

If the decision to apply TA-SAR is performed by each respective RF transmission module (e.g., by an antenna-specific RF exposure manager at each RF transmission module), then each respective RF transmission module performs the TA-SAR process shown in steps 1414-1420 with the simultaneous TAS parameters that are input to the RF transmission module from the RF exposure manager from 1408. For example, for a first antenna (Antenna A), the corresponding RF transmission module utilizes the parameters $UpThr_a-K_a$, $LowThr_a-K_a$, and $DPR\_On_a-K_a$ in steps 1414, as well as the corresponding average power (Avg Power) for Antenna A. In 1414, the comparison for the Avg Power for the antenna is compared to the upper threshold (UppTh) value. In this example, for Antenna A, this includes performing a comparison of the average power for Antenna A ($Avg\ Power_a$) to $UpThr_a-K_a$. If $Avg\ Power_A$ is greater than or equal to $UpThr_a-K_a$, then DPR is triggered ON 1416, and a transmit power according to $DPR\_On_a-K_a$ is utilized. If $Avg\ Power_a$ is less than $UpThr_a-K_a$, then a comparison of $Avg\ Power_a$ to the lower threshold for Antenna A is performed 1418. The lower threshold may factor into account the respective amount of the power reduction applied to Antenna A, i.e., $LowThr_a-K_a$. If $Avg\ Power_a$ is less than $LowThr_a-K_a$, then DPR is triggered OFF 1420, and the transmit power for Antenna A may correspond to the DPR_OFF value, or the maximum transmit power for Antenna A. In some aspects, this may include applying the respective amount of the power reduction for Antenna A to the DPR_OFF value, i.e., $DPR\_OFF_a-K_a$, or Pa-Ka as discussed above.

Figure 15:
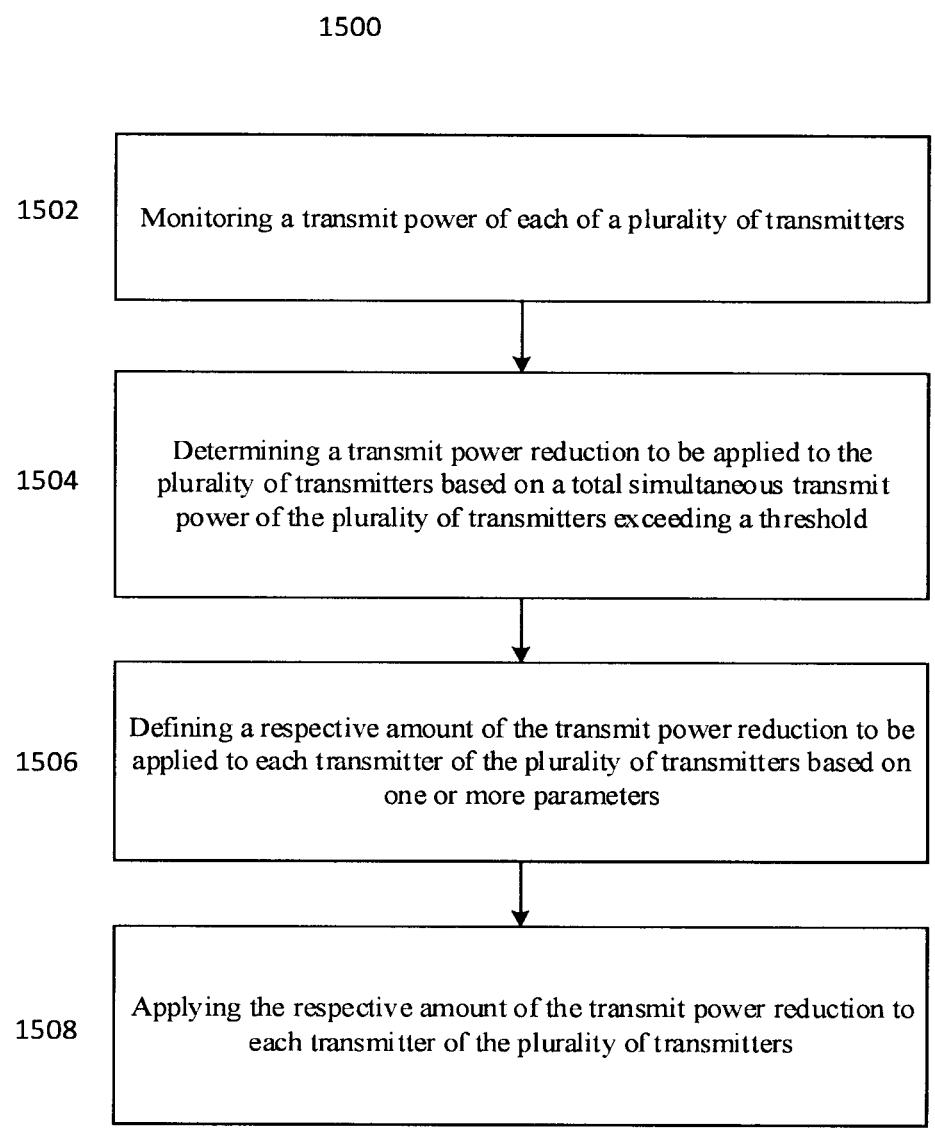

FIG. 15 is a flowchart 1500 illustrating a method for device operation according to some aspects. The device may include one or more processors and one or more non-transitory computer readable media with programmable instructions to cause the one or more processors to execute the method described below. It is appreciated that flowchart 1500 may be simplified for purposes of this explanation.

In 1502, the transmit power of each of a plurality of transmitters is monitored. This may include monitoring a requested power for transmissions via each transmitter of the plurality of transmitters, where the requested power is based on a system workload or a network traffic information corresponding to each transmitter of the plurality of transmitters.

The method further includes determining a transmit power reduction to be applied to the plurality of transmitters based on a total simultaneous transmit power of the plurality of transmitters exceeding a threshold 1504. This may include determining the total simultaneous transmit power which includes adding the requested transmit powers for each of the plurality of transmitters that are requested for a same time period. The threshold may be a regulatory limit for simultaneous transmission power for the plurality of transmitters. The determination of the transmit power reduction (i.e., K) may include computing a difference between the total simultaneous transmit power and the threshold.

The method further includes defining a respective amount of the transmit power reduction to be applied to each transmitter of the plurality of transmitters based on one or more parameters 1506. For example, a respective amount for a first transmitter (Antenna A) may be defined as Ka and a respective amount for a second transmitter (Antenna B) may be defined as Kb, where K=Ka+Kb. The one or more parameters may include, for example: a priority of a radio access technology being communicated from each transmitter of the plurality of transmitters; a transmission signal quality value corresponding to each of the plurality of transmitters; a performance metric for transmissions being transmitted from each of the plurality of transmitters; or a network traffic information or system workload for a radio access technology being communicated via each of the plurality of transmitters.

The method further includes applying the respective amount of the transmit power reduction to each transmitter of the plurality of transmitters 1508. For example, this may include providing the RF transmission module associated with each transmitter with Ka for Antenna A and Kb for Antenna B.

Although not shown in flowchart 1500, the method may further include each transmitter of the plurality of transmitters may then apply its respective amount of the transmit power reduction (e.g., Ka for Antenna A or Kb for Antenna B) to one or more TA-SAR parameters if a TA-SAR method is used. The TA-SAR parameters may include, for example, one or more of an upper threshold, a lower threshold, a dynamic power reduction (DPR) ON value, or a DPR OFF value, and may be based on an average transmit power for the respective transmitter of the plurality of transmitters computed during an averaging time. The DPR_ON value (or the DPR_ON value minus the respective amount of the transmit power reduction) may be applied when the average transmit power is greater than or equal to the upper threshold (or the upper threshold minus the respective amount of the transmit power reduction) for the respective transmitter. The DPR_OFF value (or the DPR_OFF value minus the respective amount of the transmit power reduction) may be applied when the average transmit power is less than or equal to the lower threshold (or the lower threshold minus the respective amount of the transmit power reduction) for the respective transmitter.

Figure 16:
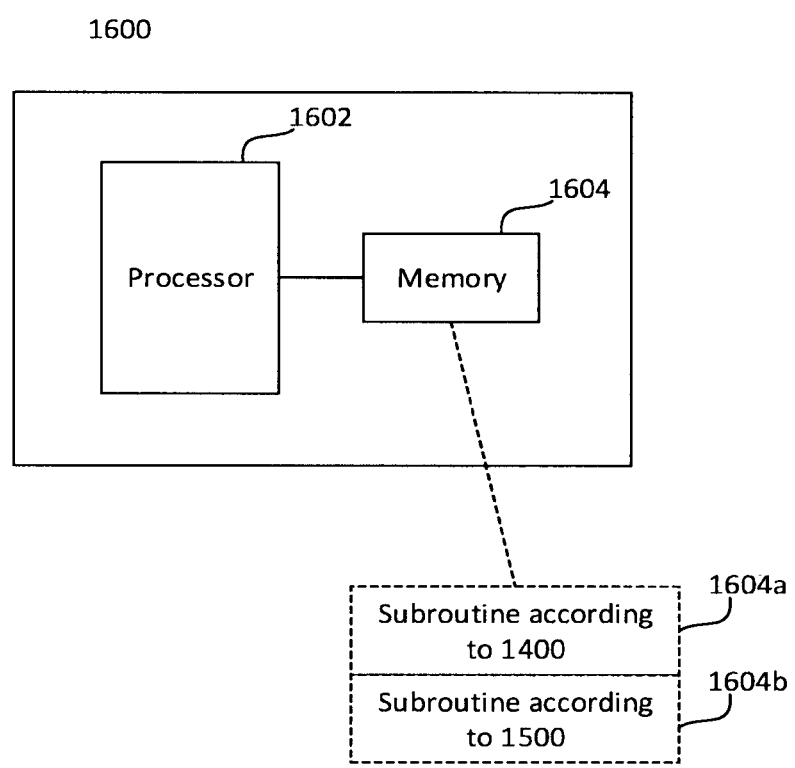
FIG. 16 exemplarily shows an internal configuration of device according to the present disclosure.

FIG. 16 shows an exemplary internal configuration of device 1600 according to some aspects, which may be included in a UE or a terminal device to implement the methods and algorithms of this disclosure. Device 1600 may correspond to device 700 from FIG. 7 and include additional subroutines as shown in FIG. 16. As shown in FIG. 16, device 1600 may include processor 1602 and memory 1604. Processor 1602 may be a single processor or multiple processors and may be configured to retrieve and execute program code to perform the transmission and reception, channel resource allocation, and cluster management as described herein. Processor 1602 may transmit and receive data over a software-level connection that is physically transmitted as wireless radio signals by a digital signal processor, RF transceiver, and an antenna system. Memory 1604 may be a non-transitory computer readable medium storing instructions for one or more of a subroutine 1604*a* which include instructions to execute a method according to flowchart 1400 and its corresponding description; and/or subroutine 1604*b* which includes instructions to execute a method according to flowchart 1500 and its corresponding description.

Figure 17:
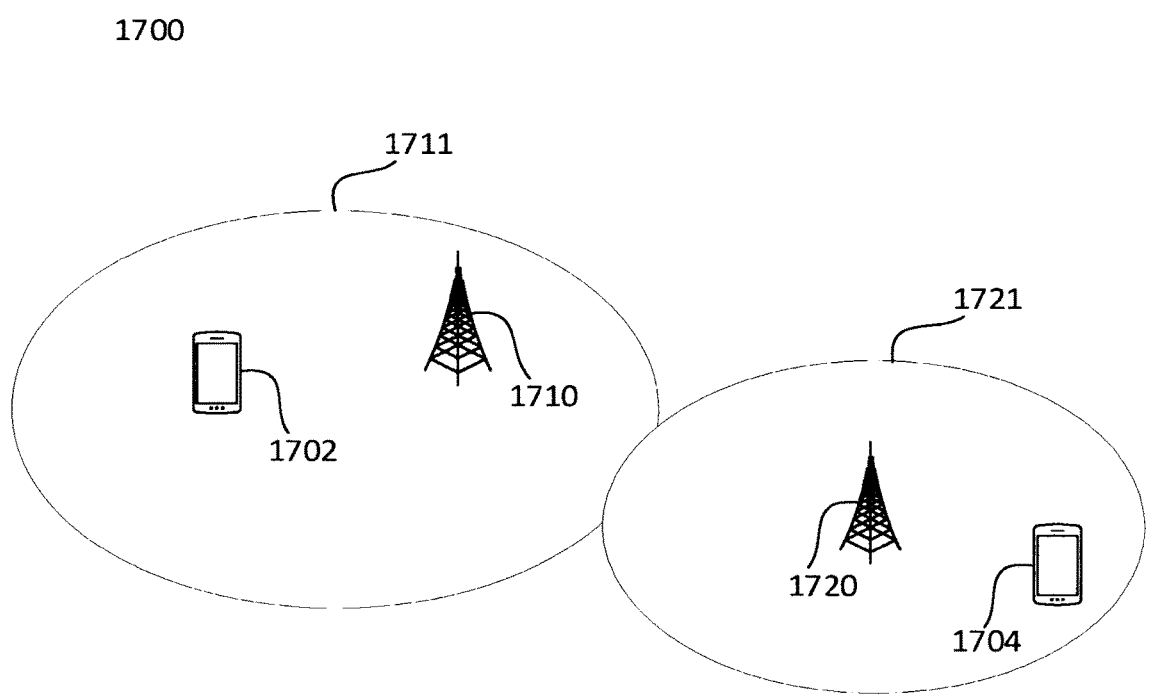
FIG. 17 exemplarily shows a radio communication network according to some aspects.

FIG. 17 shows exemplary radio communication network 1700 according to some aspects, which may include terminal devices 1702 and 1704 in addition to network access nodes (i.e., network access points) 1710 and 1720 with corresponding coverage regions (i.e., cells) 1711 and 1721, respectively. Communication network 1700 may communicate via network access nodes 1710 and 1720 with terminal devices 1702 and 1704 via various mechanisms. Although certain examples described herein may refer to a particular radio access network context (e.g., LTE, 5G, other 3rd Generation Partnership Project (3GPP) networks, WLAN/Wi-Fi, etc.), these examples are demonstrative and may therefore be analogously applied to any other type or configuration of radio access network. The number of network access nodes and terminal devices in radio communication network 1700 is exemplary and is scalable to any amount.

In an exemplary cellular context, network access nodes 1710 and 1720 may be base stations (e.g., eNodeBs, gNodeBs, Base Transceiver Stations (BTSs), or any other type of base station), while terminal devices 1702 and 1704 may be cellular terminal devices (e.g., Mobile Stations (MSs), User Equipments (UEs), or any type of cellular terminal device). Network access nodes 1710 and 1720 may therefore interface (e.g., via backhaul interfaces) with a cellular core network such as an Evolved Packet Core (EPC, for LTE), Core Network (CN, for 5G), or other cellular core networks, which may also be considered part of radio communication network 1700. The cellular core network may interface with one or more external data networks. In an exemplary short-range context, network access node 1710 and 1720 may be access points (APs, e.g., WLAN or WiFi APs), while terminal device 1702 and 1704 may be short range terminal devices (e.g., stations (STAs)). Network access nodes 1710 and 1720 may interface (e.g., via an internal or external router) with one or more external data networks.

The radio access network and core network (if applicable, e.g., for a cellular context) of radio communication network 1700 may be governed by communication protocols that can vary depending on the specifics of radio communication network 1700. Such communication protocols may define the scheduling, formatting, and routing of both user and control data traffic through radio communication network 1700, which includes the transmission and reception of such data through both the radio access and core network domains of radio communication network 1700. Accordingly, terminal devices 1702 and 1704 and network access nodes 1710 and 1720 may follow the defined communication protocols to transmit and receive data over the radio access network domain of radio communication network 1700, while the core network may follow the defined communication protocols to route data within and outside of the core network.

Figure 18:
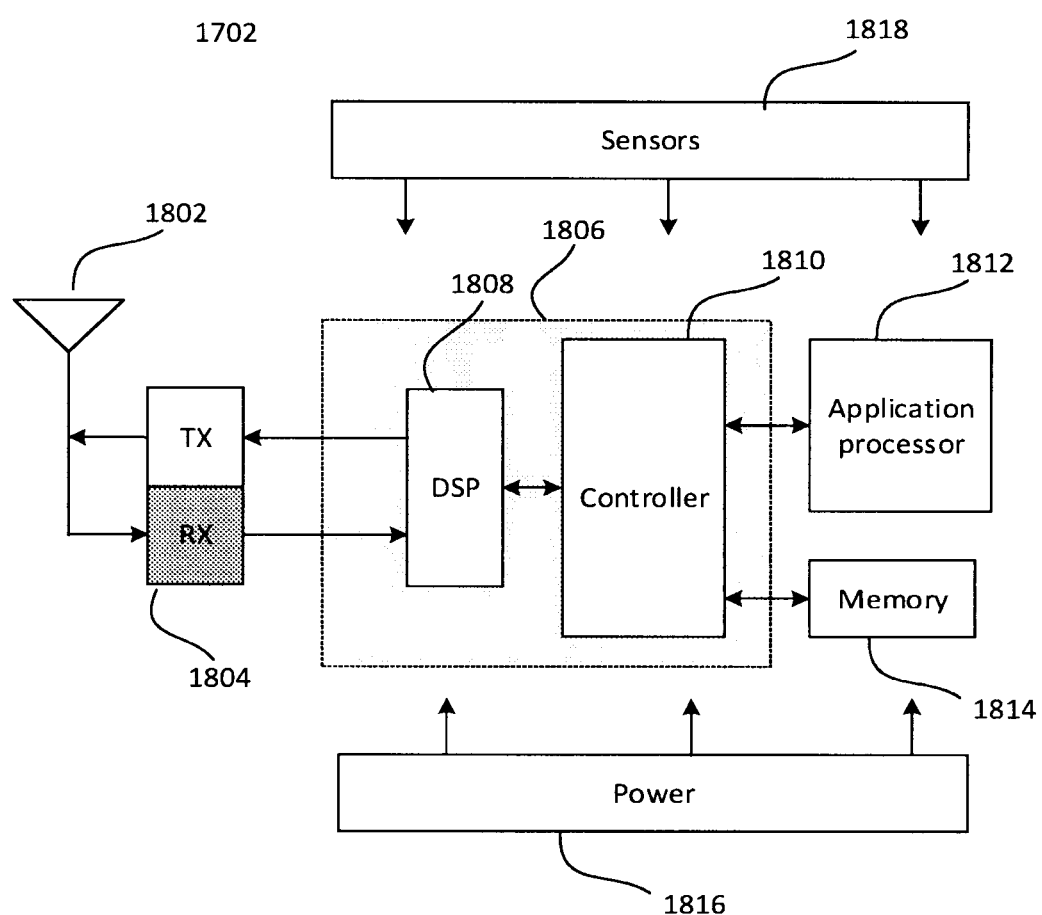
FIG. 18 exemplarily shows an internal configuration of terminal device according to some aspects.

FIG. 18 shows an internal configuration of terminal device 1702 according to some aspects, which may include antenna system 1802, radio frequency (RF) transceiver 1804, baseband modem 1806 (including digital signal processor 1808 and controller 1810), application processor 1812, memory 1814, power supply 1816, and one or more sensor(s) 1818. Although not explicitly shown in FIG. 2, in some aspects terminal device 1702 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 1702 may transmit and receive radio signals on one or more radio access networks. Baseband modem 1806 may direct such communication functionality of terminal device 1702 according to the communication protocols associated with each radio access network and may execute control over antenna system 1802 and RF transceiver 1804 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 1702 shown in FIG. 18 depicts only a single instance of such components.

Terminal device 1702 may transmit and receive wireless signals with antenna system 1802, which may be a single antenna or an antenna array that includes multiple antennas. In the receive (RX) path, RF transceiver 1804 may receive analog radio frequency signals from antenna system 1802 and perform analog and digital RF front-end processing on the analog radio frequency signals to produce digital baseband samples (e.g., In-Phase/Quadrature (IQ) samples) to provide to baseband modem 1806. RF transceiver 1804 may include analog and digital reception components including amplifiers (e.g., Low Noise Amplifiers (LNAs)), filters, RF demodulators (e.g., RF IQ demodulators)), and analog-to-digital converters (ADCs), which RF transceiver 1804 may utilize to convert the received radio frequency signals to digital baseband samples. In the transmit (TX) path, RF transceiver 1804 may receive digital baseband samples from baseband modem 1806 and perform analog and digital RF front-end processing on the digital baseband samples to produce analog radio frequency signals to provide to antenna system 1802 for wireless transmission. RF transceiver 1804 may thus include analog and digital transmission components including amplifiers (e.g., Power Amplifiers (PAs), filters, RF modulators (e.g., RF IQ modulators), and digital-to-analog converters (DACs), which RF transceiver 1804 may utilize to mix the digital baseband samples received from baseband modem 1806 and produce the analog radio frequency signals for wireless transmission by antenna system 1802. In some aspects baseband modem 1806 may control the RF transmission and reception of RF transceiver 1804, including specifying the transmit and receive radio frequencies or transmit powers for operation of RF transceiver 1804.

As shown in FIG. 18, baseband modem 1806 may include digital signal processor 1808, which may perform physical layer (PHY, Layer 1) transmission and reception processing to, in the transmit path, prepare outgoing transmit data provided by controller 1810 for transmission via RF transceiver 1804, and, in the receive path, prepare incoming received data provided by RF transceiver 1804 for processing by controller 1810. Digital signal processor 1808 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 1808 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 1808 may include one or more processors configured to retrieve and execute program code that defines control and processing logic for physical layer processing operations. In some aspects, digital signal processor 1808 may execute processing functions with software via the execution of executable instructions. In some aspects, digital signal processor 1808 may include one or more dedicated hardware circuits (e.g., ASICs, FPGAs, and other hardware) that are digitally configured to specific execute processing functions, where the one or more processors of digital signal processor 1808 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 1808 may be realized as a coupled integrated circuit.

Terminal device 1702 may be configured to operate according to one or more radio communication technologies. Digital signal processor 1808 may be responsible for lower-layer processing functions of the radio communication technologies, while controller 1810 may be responsible for upper-layer protocol stack functions. Controller 1810 may thus be responsible for controlling the radio communication components of terminal device 1702 (antenna system 1802, RF transceiver 1804, and digital signal processor 1808) in accordance with the communication protocols of each supported radio communication technology, and accordingly may represent the Access Stratum and Non-Access Stratum (NAS) (also encompassing Layer 2 and Layer 3) of each supported radio communication technology. Controller 1810 may be structurally embodied as a protocol processor configured to execute protocol software (retrieved from a controller memory) and subsequently control the radio communication components of terminal device 1702 in order to transmit and receive communication signals in accordance with the corresponding protocol control logic defined in the protocol software. Controller 1810 may include one or more processors configured to retrieve and execute program code that defines the upper-layer protocol stack logic for one or more radio communication technologies, which can include Data Link Layer/Layer 2 and Network Layer/Layer 3 functions. Controller 1810 may be configured to perform both user-plane and control-plane functions to facilitate the transfer of application layer data to and from radio terminal device 1702 according to the specific protocols of the supported radio communication technology.

Accordingly, baseband modem 1806 may be configured to implement the methods and/or algorithms described in this disclosure.

In some aspects, terminal device 1702 may be configured to transmit and receive data according to multiple RATs. Accordingly, in some aspects one or more of antenna system 1802, RF transceiver 1804, digital signal processor 1808, and controller 1810 may include separate components or instances dedicated to different radio communication technologies and/or unified components that are shared between different radio communication technologies. For example, in some aspects controller 1810 may be configured to execute multiple protocol stacks, each dedicated to a different radio communication technology and either at the same processor or different processors. In some aspects, digital signal processor 1808 may include separate processors and/or hardware accelerators that are dedicated to different respective radio communication technologies, and/or one or more processors and/or hardware accelerators that are shared between multiple radio communication technologies. In some aspects, RF transceiver 1804 may include separate RF circuitry sections dedicated to different respective radio communication technologies, and/or RF circuitry sections shared between multiple radio communication technologies. In some aspects, antenna system 1802 may include separate antennas dedicated to different respective radio communication technologies, and/or antennas shared between multiple radio communication technologies. Accordingly, while antenna system 1802, RF transceiver 1804, digital signal processor 1808, and controller 1810 are shown as individual components in FIG. 18, in some aspects antenna system 1802, RF transceiver 1804, digital signal processor 1808, and/or controller 1810 can encompass separate components dedicated to different radio communication technologies.

The one or more sensor(s) 1818 may include proximity sensors for detecting the presence of a user as discussed herein and/or the wideband RF sensor as discussed herein.

Figure 19:
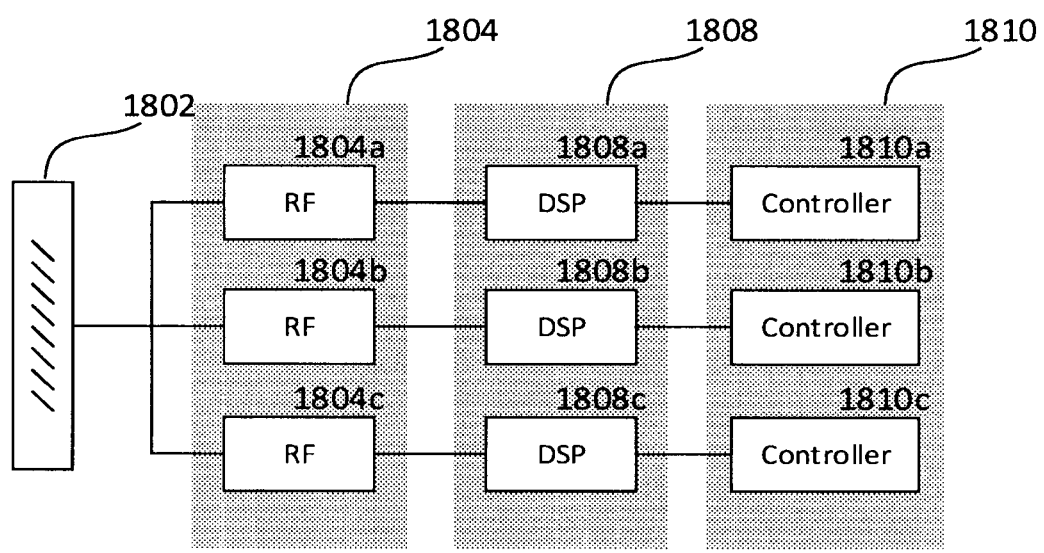
FIG. 19 exemplarily shows a configuration of signal acquisition and processing circuitry according to some aspects.

FIG. 19 shows an example in which RF transceiver 1804 includes RF transceiver 1804*a* for a first radio communication technology, RF transceiver 1804*b* for a second radio communication technology, and RF transceiver 1804*c* for a third radio communication technology. Likewise, digital signal processor 1808 includes digital signal processor 1808*a* for the first radio communication technology, digital signal processor 1808*b* for the second radio communication technology, and digital signal processor 1808*c* for the third radio communication technology. Similarly, controller 1810 may include controller 1810*a* for the first radio communication technology, controller 1810*b* for the second radio communication technology, and controller 1810*c* for the third radio communication technology. RF transceiver 1804*a*, digital signal processor 1808*a*, and controller 1810*a* thus form a communication arrangement (e.g., the hardware and software components dedicated to a particular radio communication technology) for the first radio communication technology, RF transceiver 1804*b*, digital signal processor 1808*b*, and controller 1810*b* thus form a communication arrangement for the second radio communication technology, and RF transceiver 1804*c*, digital signal processor 1808*c*, and controller 1810*c* thus form a communication arrangement for the third radio communication technology. While depicted as being logically separate in FIG. 19, any components of the communication arrangements may be integrated into a common component.

Terminal device 1702 may also include application processor 1812, memory 1814, and power supply 1812. Application processor 1812 may be a CPU and may be configured to handle the layers above the protocol stack, including the transport and application layers. Application processor 1812 may be configured to execute various applications and/or programs of terminal device 1702 at an application layer of terminal device 102, such as an operating system (OS), a user interface (UI) for supporting user interaction with terminal device 1702, and/or various user applications. The application processor may interface with baseband modem 1806 and act as a source (in the transmit path) and a sink (in the receive path) for user data, such as voice data, audio/video/image data, messaging data, application data, basic Internet/web access data, etc.

Memory 1814 may embody a memory component of terminal device 1702, such as a hard drive or another such permanent memory device. Although not explicitly depicted in FIG. 18, the various other components of terminal device 1702 shown in FIG. 18 may additionally each include integrated permanent and non-permanent memory components, such as for storing software program code, buffering data, etc.

Power supply 1816 may be an electrical power source that provides power to the various electrical components of terminal device 1702. Depending on the design of terminal device 1702, power supply 1816 may be a 'definite' power source such as a battery (rechargeable or disposable) or an 'indefinite' power source such as a wired electrical connection. Operation of the various components of terminal device 1702 may thus pull electrical power from power supply 1816.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains less elements than the set.

The terms "circuit" or "circuitry" as used herein are understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which is described in further detail within this disclosure, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

The term "terminal device" utilized herein refers to user-side devices (both mobile and immobile) that can connect to a core network and various external networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can also support wired communications in addition to wireless communications. Furthermore, terminal devices can include vehicular communication devices that function as terminal devices.

The term "network" as utilized herein, e.g., in reference to a communication network such as a radio communication network, encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving, i.e., unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

The following examples pertain to further aspects of this disclosure.

Example 1a is a device including a processor configured to determine a terminal device transmit power value indicative of an aggregate of transmit powers from a plurality of radio frequency transceivers located in a terminal device based on a proximity detection of a user; obtain a measurement of an external device power value indicative of a radio frequency power in the terminal device's external environment; compute a total power level value based on at least one of the terminal device transmit power value and the external device power value; and perform a comparison of the total power level value to a power safety threshold and execute an action based on the comparison.

In Example 2a, the subject matter of Example(s) 1a may include the device further configured to generate a transmission based on the action.

In Example 3a, the subject matter of Example(s) 1a-2a may include where the comparison includes the total power level value being greater than the power safety threshold.

In Example 4a, the subject matter of Example(s) 3a may include where the action includes issuing a warning and indicating the total power level value through a user interface.

In Example 5a, the subject matter of Example(s) 3a-4a may include where the action includes adjusting a transmit power for one or more of the plurality of radio frequency transceivers based on a difference between the total power level value and the power safety threshold.

In Example 6a, the subject matter of Example(s) 5a may include the device further configured to reduce the difference between the total power level value and the power safety threshold by reducing a transmit power of one or more of the plurality of radio frequency transceivers.

In Example 7a, the subject matter of Example(s) 6a may include where the transmit power of each of the plurality of radio frequency transceivers is reduced by a weighted amount based on a priority of each of the plurality of radio frequency transceivers, where the transmit power of higher priority radio frequency transceivers is reduced by a lower amount proportional to lower priority radio frequency transceivers.

In Example 8a, the subject matter of Example(s) 1a-2a may include where the comparison includes the total power level value being less than the power safety threshold.

In Example 9a, the subject matter of Example(s) 8a may include where the action includes adjusting a transmit power for one of more of the plurality of radio frequency transceivers based on a difference between the total power level value and the power safety threshold.

In Example 10a, the subject matter of Example(s) 9a may include the device further configured to reduce the difference between the total power level value and the power safety threshold by increasing the transmit power of one or more of the plurality of radio frequency transceivers.

In Example 11a, the subject matter of Example(s) 1a-2a may include where the transmit power of each of the plurality of radio frequency transceivers is increased by a weighted amount up to a maximum allowable transmit power based on a priority of each of the plurality of radio frequency transceivers, where the transmit power of higher priority radio frequency transceivers is prioritized over, or increased by a greater amount proportional to, lower priority radio frequency transceivers.

In Example 12a, the subject matter of Example(s) 1a-11a may include where the plurality of radio frequency transceivers includes one or more of a cellular transceiver, wireless local area network transceiver, a Bluetooth transceiver, or a Near Field Communication transceiver.

In Example 13a, the subject matter of Example(s) 1a-12a may include where the terminal device transmit power value is based on the plurality of radio frequency transceivers that are currently transmitting.

In Example 14a, the subject matter of Example(s) 1a-13a may include where the measurement of the external device power is performed by a wideband radio frequency power sensor mounted in the terminal device and coupled to the processor, where the wideband radio frequency sensor provides the measurement of the external device power to the processor.

In Example 15a, the subject matter of Example(s) 14a may include where the wideband radio frequency sensor is configured to measure a range of frequencies including one or more of cellular frequencies, wireless local area network frequencies, Bluetooth frequencies, or Near Field Communication frequencies.

Example 16a is a method including determining a terminal device transmit power value indicative of an aggregate of transmit powers from a plurality of radio frequency transceivers located in a terminal device based on a proximity detection of a user; obtaining a measurement of an external device power value indicative of a radio frequency power in the terminal device's external environment; computing a total power level value based on at least one of the terminal device transmit power value and the external device power value; and performing a comparison of the total power level value to a power safety threshold and execute an action based on the comparison.

In Example 17a, the subject matter of Example(s) 16a may include generating a transmission based on the action.

In Example 18a, the subject matter of Example(s) 16a-17a may include where the comparison includes the total power level value being greater than the power safety threshold.

In Example 19a, the subject matter of Example(s) 18a may include where the action includes issuing a warning and indicating the total power level value through a user interface.

In Example 20a, the subject matter of Example(s) 18a-19a may include where the action includes adjusting a transmit power for one or more of the plurality of radio frequency transceivers based on a difference between the total power level value and the power safety threshold.

In Example 21a, the subject matter of Example(s) 20a may include reducing the difference between the total power level value and the power safety threshold by reducing a transmit power of one or more of the plurality of radio frequency transceivers.

In Example 22a, the subject matter of Example(s) 21a may include where the transmit power of each of the plurality of radio frequency transceivers is reduced by a weighted amount based on a priority of each of the plurality of radio frequency transceivers, where the transmit power of higher priority radio frequency transceivers is reduced by a lower amount proportional to lower priority radio frequency transceivers.

In Example 23a, the subject matter of Example(s) 16a-17a may include where the comparison includes the total power level value being less than the power safety threshold.

In Example 24a, the subject matter of Example(s) 23a may include where the action includes adjusting a transmit power for one of more of the plurality of radio frequency transceivers based on a difference between the total power level value and the power safety threshold.

In Example 25a, the subject matter of Example(s) 24a may include reducing the difference between the total power level value and the power safety threshold by increasing the transmit power of one or more of the plurality of radio frequency transceivers.

In Example 26a, the subject matter of Example(s) 25a may include where the transmit power of each of the plurality of radio frequency transceivers is increased by a weighted amount up to a maximum allowable transmit power based on a priority of each of the plurality of radio frequency transceivers, where the transmit power of higher priority radio frequency transceivers is prioritized over, or increased by a greater amount proportional to, lower priority radio frequency transceivers.

In Example 27a, the subject matter of Example(s) 16a-26a may include where the plurality of radio frequency transceivers includes one or more of a cellular transceiver, wireless local area network transceiver, a Bluetooth transceiver, or a Near Field Communication transceiver.

In Example 28a, the subject matter of Example(s) 16a-27a may include where the terminal device transmit power value is based on the plurality of radio frequency transceivers that are currently transmitting.

In Example 29a, the subject matter of Example(s) 16a-28a may include performing the measurement of the external device power with a wideband radio frequency power sensor mounted in the terminal device and coupled to the processor, where the wideband radio frequency sensor provides the measurement of the external device power to the processor.

In Example 30a, the subject matter of Example(s) 29a may include where the wideband radio frequency sensor is configured to measure a range of frequencies including one or more of cellular frequencies, wireless local area network frequencies, Bluetooth frequencies, or Near Field Communication frequencies.

Example 31a is a device including means to determine a terminal device transmit power value indicative of an aggregate of transmit powers from a plurality of radio frequency transceivers located in a terminal device based on a proximity detection of a user; means to obtain a measurement of an external device power value indicative of a radio frequency power in the terminal device's external environment; means to compute a total power level value based on at least one of the terminal device transmit power value and the external device power value; and means to perform a comparison of the total power level value to a power safety threshold and execute an action based on the comparison.

Example 32a is one or more non-transitory computer-readable media storing instructions thereon that, when executed by at least one processor, direct the at least one processor to perform a method or realize a device as recited in any of Examples 1a-31a.

Example 1b is a device including a processor configured to monitor a transmit power of each of a plurality of transmitters; determine a transmit power reduction to be applied to the plurality of transmitters based on a total simultaneous transmit power of the plurality of transmitters exceeding a threshold; define a respective amount of the transmit power reduction to be applied to each transmitter of the plurality of transmitters based on one or more parameters; and apply the respective amount of the transmit power reduction to each transmitter of the plurality of transmitters.

In Example 2b, the subject matter of Example(s) 1b may include where the monitoring of the transmit power for the plurality of transmitter includes monitoring a requested power for transmissions via each transmitter of the plurality of transmitters.

In Example 3b, the subject matter of Example(s) 2b may include where the requested power is based on a system workload or a network traffic information corresponding to each transmitter of the plurality of transmitters.

In Example 4b, the subject matter of Example(s) 2b-3b may include where determining the total simultaneous transmit power includes adding the requested transmit powers for each of the plurality of transmitters that are requested for a same time period.

In Example 5b, the subject matter of Example(s) 1b-4b may include where the threshold is a regulatory limit for simultaneous transmission power for the plurality of transmitters.

In Example 6b, the subject matter of Example(s) 1b-5b may include where determining the transmit power reduction includes computing a difference between the total simultaneous transmit power and the threshold.

In Example 7b, the subject matter of Example(s) 1b-6b may include where defining the respective amount of the transmit power reduction to be applied to each respective transmitter of the plurality of transmitters includes defining a first amount for a first transmitter of the plurality of transmitters and defining a second amount for a second transmitter of the plurality of transmitters.

In Example 8b, the subject matter of Example(s) 1b-7b may include where the one or more parameters include: a priority of a radio access technology being communicated from each transmitter of the plurality of transmitters; a transmission signal quality value corresponding to each of the plurality of transmitters; a performance metric for transmissions being transmitted from each of the plurality of transmitters; or a network traffic information or system workload for a radio access technology being communicated via each of the plurality of transmitters.

In Example 9b, the subject matter of Example(s) 1b-8b may include where each transmitter of the plurality of transmitters is additionally configured to apply its respective amount of the transmit power reduction to one or more time-averaging (TA)-specific absorption rate (SAR) parameters.

In Example 10b, the subject matter of Example(s) 9b may include where the TA-SAR parameters include one or more of an upper threshold, a lower threshold, a dynamic power reduction (DPR) ON value, or a DPR OFF value for a respective transmitter of the plurality of transmitters.

In Example 11b, the subject matter of Example(s) 9b-10b may include where the TA-SAR parameters are based on an average transmit power for the respective transmitter of the plurality of transmitters computed during an averaging time.

In Example 12b, the subject matter of Example(s) 10b-11b may include where the DPR ON value is applied when the average transmit power is greater than or equal to the upper threshold for the respective transmitter.

In Example 13b, the subject matter of Example(s) 10b-12b may include where DPR OFF value is applied when the average transmit power is less than or equal to the lower threshold for the respective transmitter.

Example 14b is a method including monitoring a transmit power of each of a plurality of transmitters; determining a transmit power reduction to be applied to the plurality of transmitters based on a total simultaneous transmit power of the plurality of transmitters exceeding a threshold; defining a respective amount of the transmit power reduction to be applied to each transmitter of the plurality of transmitters based on one or more parameters; and applying the respective amount of the transmit power reduction to each transmitter of the plurality of transmitters.

In Example 15b, the subject matter of Example(s) 14b may include where the monitoring of the transmit power for the plurality of transmitter includes monitoring a requested power for transmissions via each transmitter of the plurality of transmitters.

In Example 16b, the subject matter of Example(s) 15b may include where the requested power is based on a system workload or a network traffic information corresponding to each transmitter of the plurality of transmitters.

In Example 17b, the subject matter of Example(s) 15b-16b may include where determining the total simultaneous transmit power includes adding the requested transmit powers for each of the plurality of transmitters that are requested for a same time period.

In Example 18b, the subject matter of Example(s) 14b-17b may include where the threshold is a regulatory limit for simultaneous transmission power for the plurality of transmitters.

In Example 19b, the subject matter of Example(s) 14b-18b may include where determining the transmit power reduction includes computing a difference between the total simultaneous transmit power and the threshold.

In Example 20b, the subject matter of Example(s) 14b-19b may include where defining the respective amount of the transmit power reduction to be applied to each respective transmitter of the plurality of transmitters includes defining a first amount for a first transmitter of the plurality of transmitters and defining a second amount for a second transmitter of the plurality of transmitters.

In Example 21b, the subject matter of Example(s) 14b-20b may include where the one or more parameters include: a priority of a radio access technology being communicated from each transmitter of the plurality of transmitters; a transmission signal quality value corresponding to each of the plurality of transmitters; a performance metric for transmissions being transmitted from each of the plurality of transmitters; or a network traffic information or system workload for a radio access technology being communicated via each of the plurality of transmitters.

In Example 22b, the subject matter of Example(s) 14b-21b may include each transmitter of the plurality of transmitters applying its respective amount of the transmit power reduction to one or more time-averaging (TA)-specific absorption rate (SAR) parameters.

In Example 23b, the subject matter of Example(s) 22b may include where the TA-SAR parameters include one or more of an upper threshold, a lower threshold, a dynamic power reduction (DPR) ON value, or a DPR OFF value for a respective transmitter of the plurality of transmitters.

In Example 24b, the subject matter of Example(s) 22b-23b may include where the TA-SAR parameters are based on an average transmit power for the respective transmitter of the plurality of transmitters computed during an averaging time.

In Example 25b, the subject matter of Example(s) 23b-24b may include triggering the DPR ON value for the respective transmitter when the average transmit power is greater than or equal to the upper threshold for the respective transmitter.

In Example 26b, the subject matter of Example(s) 23b-25b may include triggering the DPR OFF value for the respective transmitter when the average transmit power is less than or equal to the lower threshold for the respective transmitter.

Example 27b is a device including means to monitor a transmit power of each of a plurality of transmitters; means to determine a transmit power reduction to be applied to the plurality of transmitters based on a total simultaneous transmit power of the plurality of transmitters exceeding a threshold; means to define a respective amount of the transmit power reduction to be applied to each transmitter of the plurality of transmitters based on one or more parameters; and means to apply the respective amount of the transmit power reduction to each transmitter of the plurality of transmitters.

Example 28b is one or more non-transitory computer-readable media storing instructions thereon that, when executed by at least one processor, direct the at least one processor to perform a method or realize a device as recited in any of Examples 1b-27b.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
monitor a transmit power for each of a plurality of transmitters;

determine a transmit power reduction to be applied to the plurality of transmitters based on a total simultaneous transmit power of the plurality of transmitters exceeding a threshold;
    define a respective amount of the transmit power reduction to be applied to each transmitter of the plurality of transmitters based on one or more parameters; and
    apply the respective amount of the transmit power reduction to each transmitter of the plurality of transmitters,
wherein each transmitter of the plurality of transmitters is additionally configured to apply its respective amount of the transmit power reduction to a plurality of time-averaging (TA)-specific absorption rate (SAR) parameters, and
wherein the TA-SAR parameters comprise a lower threshold, a dynamic power reduction (DPR) ON value, and a DPR OFF value for a respective transmitter of the plurality of transmitters.

2. The device of claim 1, wherein the monitoring of the transmit power for the plurality of transmitter comprises monitoring a requested power for transmissions via each transmitter of the plurality of transmitters.

3. The device of claim 2, wherein the requested power is based on a system workload or a network traffic information corresponding to each transmitter of the plurality of transmitters.

4. The device of claim 2, wherein determining the total simultaneous transmit power comprises adding the requested transmit powers for each of the plurality of transmitters that are requested for a same time period.

5. The device of claim 1, wherein the threshold is a regulatory limit for simultaneous transmission power for the plurality of transmitters.

6. The device of claim 1, wherein determining the transmit power reduction comprises computing a difference between the total simultaneous transmit power and the threshold.

7. The device of claim 1, wherein defining the respective amount of the transmit power reduction to be applied to each respective transmitter of the plurality of transmitters comprises defining a first amount for a first transmitter of the plurality of transmitters and defining a second amount for a second transmitter of the plurality of transmitters.

8. The device of claim 1, wherein the one or more parameters comprise:
    a priority of a radio access technology being communicated from each transmitter of the plurality of transmitters.

9. The device of claim 1, wherein the one or more parameters comprise:
    a transmission signal quality value corresponding to each of the plurality of transmitters.

10. The device of claim 1, wherein the one or more parameters comprise:
    a performance metric for transmissions being transmitted from each of the plurality of transmitters; or
    a network traffic information or system workload for a radio access technology being communicated via each of the plurality of transmitters.

11. A method comprising:
monitoring a transmit power of each of a plurality of transmitters;
determining a transmit power reduction to be applied to the plurality of transmitters based on a total simultaneous transmit power of the plurality of transmitters exceeding a threshold;
    defining a respective amount of the transmit power reduction to be applied to each transmitter of the plurality of transmitters based on one or more parameters; and
    applying the respective amount of the transmit power reduction to each transmitter of the plurality of transmitters, comprising applying by each transmitter its respective amount of the transmit power reduction to a plurality of time-averaging (TA)-specific absorption rate (SAR) parameters, and
wherein the TA-SAR parameters comprise a lower threshold, a dynamic power reduction (DPR) ON value, and a DPR OFF value for a respective transmitter of the plurality of transmitters.

12. The method of claim 11, wherein the monitoring of the transmit power for the plurality of transmitter comprises monitoring a requested power for transmissions via each transmitter of the plurality of transmitters.

13. The method of claim 12, wherein the requested power is based on a system workload or a network traffic information corresponding to each transmitter of the plurality of transmitters.

14. The method of any one of claim 12, wherein determining the total simultaneous transmit power comprises adding the requested transmit powers for each of the plurality of transmitters that are requested for a same time period.

15. The method of claim 11, wherein determining the transmit power reduction comprises computing a difference between the total simultaneous transmit power and the threshold.

16. The method of claim 11, wherein defining the respective amount of the transmit power reduction to be applied to each respective transmitter of the plurality of transmitters includes defining a first amount for a first transmitter of the plurality of transmitters and defining a second amount for a second transmitter of the plurality of transmitters.

17. The method of claim 11, where the threshold is a regulatory limit for simultaneous transmission power for the plurality of transmitters.

18. The method of claim 11, wherein the one or more parameters comprise:
    a priority of a radio access technology being communicated from each transmitter of the plurality of transmitters;
    a transmission signal quality value corresponding to each of the plurality of transmitters;
    a performance metric for transmissions being transmitted from each of the plurality of transmitters; or
    a network traffic information or system workload for a radio access technology being communicated via each of the plurality of transmitters.

19. One or more non-transitory computer-readable media storing instructions thereon that, when executed by at least one processor, direct the at least one processor to perform:
monitoring a transmit power of each of a plurality of transmitters;
determining a transmit power reduction to be applied to the plurality of transmitters based on a total simultaneous transmit power of the plurality of transmitters exceeding a threshold;
    defining a respective amount of the transmit power reduction to be applied to each transmitter of the plurality of transmitters based on one or more parameters; and
    applying the respective amount of the transmit power reduction to each transmitter of the plurality of transmitters, comprising applying by each transmitter its respective amount of the transmit power reduction to a plurality of time-averaging (TA)-specific absorption rate (SAR) parameters, and wherein the TA-SAR parameters comprise a lower threshold, a dynamic power reduction (DPR) ON value, and a DPR OFF value for a respective transmitter of the plurality of transmitters.

20. The one or more non-transitory computer-readable media of claim 19, wherein the monitoring of the transmit power for the plurality of transmitter comprises monitoring a requested power for transmissions via each transmitter of the plurality of transmitters.

* * * * *